(12) United States Patent
Hirai et al.

(10) Patent No.: US 10,654,138 B2
(45) Date of Patent: May 19, 2020

(54) PRODUCTION FACILITY, PRODUCTION FACILITY DESIGN METHOD, PRODUCTION FACILITY CONTROL METHOD, AND MANUFACTURING METHOD

(71) Applicant: MITSUBISHI HEAVY INDUSTRIES, LTD., Tokyo (JP)

(72) Inventors: Makoto Hirai, Tokyo (JP); Takuya Goto, Tokyo (JP); Tsuyoshi Kaneko, Tokyo (JP); Katsumi Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 56 days.

(21) Appl. No.: 15/569,984

(22) PCT Filed: Jul. 12, 2016

(86) PCT No.: PCT/JP2016/070605
§ 371 (c)(1),
(2) Date: Oct. 27, 2017

(87) PCT Pub. No.: WO2017/029912
PCT Pub. Date: Feb. 23, 2017

(65) Prior Publication Data
US 2018/0104778 A1    Apr. 19, 2018

(30) Foreign Application Priority Data

Aug. 20, 2015 (JP) .................................. 2015-162680

(51) Int. Cl.
*G06Q 10/00* (2012.01)
*B23P 21/00* (2006.01)
(Continued)

(52) U.S. Cl.
CPC ............. *B23P 21/004* (2013.01); *B23P 21/00* (2013.01); *B64F 5/00* (2013.01); *B64F 5/10* (2017.01);
(Continued)

(58) Field of Classification Search
CPC ........... G05B 2219/31338; G05B 2219/31274; Y02P 90/60; Y02P 90/265; B23P 21/004; B64F 5/10
See application file for complete search history.

(56) References Cited

U.S. PATENT DOCUMENTS 4,683,651 A * 8/1987 Taketani ................ B62D 65/18
                                                                29/786
6,104,965 A * 8/2000 Lim .................. G05B 19/41865
                                                                700/112
(Continued)

FOREIGN PATENT DOCUMENTS

EP    2221151 A2    8/2010
EP    2604523 A2    6/2013
(Continued)

OTHER PUBLICATIONS

International Search Report in PCT/JP2016/070605, dated Sep. 20, 2016. 5pp.

(Continued)

*Primary Examiner* — Kidest Bahta
(74) *Attorney, Agent, or Firm* — Kanesaka Berner and Partners LLP

(57) ABSTRACT

A production facility is provided with: an AGV for transporting a plurality of fuselage panels of multiple types having different shapes in a mixed state on a previously determined transport path; a plurality of A/Rs for riveting the fuselage panels; work areas set so as to correspond to the respective A/Rs in which the A/Rs move to rivet the fuselage
(Continued)

panels; and a buffer area, set beforehand in the transport path adjacent to the work area, to which the A/R corresponding to the adjacent work area moves so as to rivet the fuselage panel. When there is no fuselage panel to be riveted in the work area adjacent to the buffer area and the fuselage panel to be riveted is present in the buffer area, a control device moves the A/R corresponding to the work area adjacent to the buffer area to the buffer area to rivet the fuselage panel.

8 Claims, 23 Drawing Sheets

(51) Int. Cl.
    *G05B 19/418*     (2006.01)
    *B64F 5/00*     (2017.01)
    *G06Q 10/06*     (2012.01)
    *B64F 5/10*     (2017.01)

(52) U.S. Cl.
    CPC ....... *G05B 19/418* (2013.01); *G05B 19/4188* (2013.01); *G05B 19/41815* (2013.01); *G06Q 10/00* (2013.01); *G06Q 10/06* (2013.01); *G05B 2219/31031* (2013.01); *G05B 2219/31054* (2013.01); *G05B 2219/31274* (2013.01); *G05B 2219/31338* (2013.01); *G05B 2219/45088* (2013.01); *G05B 2219/45126* (2013.01); *Y02P 90/02* (2015.11); *Y02P 90/265* (2015.11); *Y02P 90/28* (2015.11); *Y02P 90/60* (2015.11)

(56) References Cited

U.S. PATENT DOCUMENTS

| | | | | |
|---|---|---|---|---|
| 6,467,605 | B1* | 10/2002 | Head, III | G05B 19/0426 |
| | | | | 198/341.07 |
| 6,708,385 | B1* | 3/2004 | Lemelson | B23Q 7/03 |
| | | | | 29/563 |
| 6,801,821 | B2* | 10/2004 | Madden | B62D 65/02 |
| | | | | 700/101 |
| 6,823,230 | B1* | 11/2004 | Jamalabad | G05B 19/4099 |
| | | | | 700/119 |
| 8,005,567 | B2* | 8/2011 | Porter | G05B 19/4097 |
| | | | | 700/179 |
| 9,014,902 | B1* | 4/2015 | Murphy | G05D 1/0295 |
| | | | | 701/26 |
| 2001/0000805 | A1* | 5/2001 | Kadono | G05B 19/4097 |
| | | | | 700/182 |
| 2003/0208302 | A1 | 11/2003 | Lemelson et al. | |
| 2004/0216983 | A1* | 11/2004 | Oldford | B62D 65/18 |
| | | | | 198/345.3 |
| 2007/0073566 | A1* | 3/2007 | Reaume | G05B 19/41865 |
| | | | | 705/7.22 |
| 2008/0019809 | A1 | 1/2008 | Takano | |
| 2010/0031489 | A1 | 2/2010 | Tobita et al. | |
| 2010/0217437 | A1 | 8/2010 | Sarh et al. | |
| 2012/0221140 | A1* | 8/2012 | Berman | G05B 19/4093 |
| | | | | 700/187 |
| 2013/0152397 | A1 | 6/2013 | Oberoi et al. | |
| 2015/0081077 | A1 | 3/2015 | Li et al. | |
| 2015/0105890 | A1* | 4/2015 | Stochosky | G06F 17/50 |
| | | | | 700/98 |
| 2015/0205286 | A1* | 7/2015 | Mitsuhashi | G05B 19/40937 |
| | | | | 700/170 |
| 2015/0307211 | A1 | 10/2015 | Oberoi et al. | |

FOREIGN PATENT DOCUMENTS

| | | |
|---|---|---|
| JP | 6-163293 A | 6/1994 |
| JP | 2001-247064 A | 9/2001 |
| JP | 2002-239848 A | 8/2002 |
| JP | 2004-50918 A | 2/2004 |
| JP | 2010-42456 A | 2/2010 |
| JP | 2012-511221 A | 5/2012 |
| JP | 5421172 B2 | 2/2014 |
| JP | 2015-93354 A | 5/2015 |

OTHER PUBLICATIONS

Richard Muther, "How to Plan a Manufacturing Cell", RMA Planning Guide # 1570, Jan. 1, 2002, pp. 1-29; 29pp.

Extended European Search Report for European Application No. 16 83 6903 dated Nov. 27, 2018; 12pp.

Partial Supplementary European Search Report in EP Application No. 16836903.1, dated Jul. 25, 2018, 13pp.

Norris, Guy, "Airbus's Automated Future Features Robotics", Aviation Week & Space Technology, May 6, 2013, retrieved on Jun. 19, 2018 from Internet, http://aviationweek.com/print/awin/airbuss-automated-futurefeatures-robotics, 4pp.

* cited by examiner

|  | NECESSARY RIVETING TIME [min] | ACTUAL RIVETING TIME [min] | REMAINING WORK [min] |
|---|---|---|---|
| Panel A | 643 | 643 | 0 |
| Panel B | 1124 | 1124 | 0 |
| Panel C | 692 | 692 | 0 |
| Panel D | 701 | 701 | 0 |
| Panel E | 1462 | 1462 | 0 |
| Panel F | 1069 | 1069 | 0 |
| Panel G | 1268 | 1268 | 0 |
| Panel H | 956 | 956 | 0 |
| Panel I | 1041 | 1041 | 0 |
| Panel J | 1244 | 1193 | 51 |
| Panel K | 1442 | 1442 | 0 |
| Panel L | 1053 | 1053 | 0 |
| Panel M | 1095 | 1095 | 0 |

FIG. 8

| Position | Pos. 1 | | Pos. 2 | | Pos. 3 | | BUFFER AREA | |
|---|---|---|---|---|---|---|---|---|
| A/R | A/R1 | | A/R2 | | A/R3 | | A/R3 | |
| Takt | Panel | Time [min] | Panel | Time [min] | Panel | Time [min] | Panel | Time [min] |
| 1 | Panel A | 377 | | 0 | | 0 | | 0 |
| 2 | Panel D | 377 | Panel A | 266 | | 0 | | 0 |
| 3 | Panel G | 377 | Panel D | 324 | Panel A | 0 | | 0 |
| 4 | Panel I | 377 | Panel G | 377 | Panel D | 0 | Panel A | 0 |
| 5 | Panel B | 377 | Panel I | 377 | Panel G | 377 | Panel D | 0 |
| 6 | Panel M | 377 | Panel B | 377 | Panel I | 240 | Panel G | 137 |
| 7 | Panel F | 377 | Panel M | 377 | Panel B | 330 | Panel I | 47 |
| 8 | Panel J | 377 | Panel F | 377 | Panel M | 337 | Panel B | 40 |
| 9 | Panel L | 377 | Panel J | 377 | Panel F | 315 | Panel M | 4 |
| 10 | Panel H | 377 | Panel L | 377 | Panel J | 377 | Panel F | 0 |
| 11 | Panel K | 377 | Panel H | 377 | Panel L | 264 | Panel J | 113 |
| 12 | Panel C | 377 | Panel K | 377 | Panel H | 202 | Panel L | 35 |
| 13 | Panel E | 377 | Panel C | 315 | Panel K | 377 | Panel H | 0 |
| 14 | | 0 | Panel E | 377 | Panel C | 0 | Panel K | 311 |
| 15 | | 0 | | 0 | Panel E | 377 | Panel C | 0 |
| 16 | | 0 | | 0 | | 0 | Panel E | 331 |

Pos. 1 WORK
Pos. 2 WORK
Pos. 3 WORK
BUFFER AREA WORK

FIG. 10

|  | NECESSARY RIVETING TIME [min] | ACTUAL RIVETING TIME [min] | REMAINING WORK [min] |
|---|---|---|---|
| Panel A | 643 | 643 | 0 |
| Panel B | 1124 | 1124 | 0 |
| Panel C | 692 | 692 | 0 |
| Panel D | 701 | 701 | 0 |
| Panel E | 1462 | 1462 | 0 |
| Panel F | 1069 | 1069 | 0 |
| Panel G | 1268 | 1268 | 0 |
| Panel H | 956 | 956 | 0 |
| Panel I | 1041 | 1041 | 0 |
| Panel J | 1244 | 1244 | 0 |
| Panel K | 1442 | 1442 | 0 |
| Panel L | 1053 | 1053 | 0 |
| Panel M | 1095 | 1095 | 0 |

FIG. 11

| | | Pos. 1 WORK |
|---|---|---|
| | | Pos. 2 WORK |
| | | Pos. 3 WORK |

| A/R | A/R1 | | A/R2 | | A/R3 | |
|---|---|---|---|---|---|---|
| Position | Pos. 1 | | Pos. 2 | | Pos. 3 | |
| Takt | Panel | Time [min] | Panel | Time [min] | Panel | Time [min] |
| 1 | Panel A | 377 | | 0 | | 0 |
| 2 | Panel B | 377 | | 0 | | 0 |
| 3 | Panel C | 377 | Panel A | 370 | | 0 |
| 4 | Panel D | 377 | Panel B | 0 | Panel A | 0 |
| 5 | Panel E | 377 | Panel C | 0 | Panel B | 0 |
| 6 | Panel K | 377 | Panel D | 377 | Panel C | 0 |
| 7 | Panel G | 377 | Panel E | 377 | Panel D | 0 |
| 8 | Panel H | 377 | Panel K | 112 | Panel E | 0 |
| 9 | Panel I | 377 | Panel G | 0 | Panel K | 265 |
| 10 | Panel J | 377 | Panel H | 175 | Panel G | 402 |
| 11 | Panel F | 377 | Panel I | 265 | Panel H | 202 |
| 12 | Panel L | 377 | Panel J | 152 | Panel I | 112 |
| 13 | Panel M | 377 | Panel F | 214 | Panel J | 225 |
| 14 | | 0 | Panel L | 292 | Panel F | 163 |
| 15 | | 0 | Panel M | 0 | Panel L | 85 |
| 16 | | 0 | | 0 | Panel M | 49 |
| | | | | | | 0 |

FIG. 18

|         | NECESSARY RIVETING TIME [min] | ACTUAL RIVETING TIME [min] | REMAINING WORK [min] |
|---------|---|---|---|
| Panel A | 643 | 643 | 0 |
| Panel B | 1124 | 1124 | 0 |
| Panel C | 692 | 692 | 0 |
| Panel D | 701 | 701 | 0 |
| Panel E | 1462 | 1462 | 0 |
| Panel F | 1069 | 1069 | 0 |
| Panel G | 1268 | 1243 | 25 |
| Panel H | 956 | 956 | 0 |
| Panel I | 1041 | 1041 | 0 |
| Panel J | 1244 | 1244 | 0 |
| Panel K | 1442 | 1442 | 0 |
| Panel L | 1053 | 1053 | 0 |
| Panel M | 1095 | 1095 | 0 |

FIG. 19

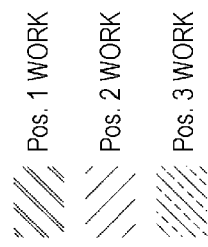

| A/R | A/R1 | | | A/R2 | | | | | A/R3 | | |
|---|---|---|---|---|---|---|---|---|---|---|---|
| Position | Pos. 1 | | | | Pos. 1 | | Pos. 2 | | | Pos. 2 | Pos. 3 |
| Takt | Panel | Time [min] | | Panel | Time [min] | Panel | Time [min] | | Panel | Time [min] | Panel | Time [min] |
| 1 | Panel A | 377 | | | 266 | | 0 | | | 0 | | 0 |
| 2 | Panel B | 377 | | Panel A | 377 | | 0 | | | 0 | | 0 |
| 3 | Panel C | 377 | | Panel B | 315 | Panel A | 0 | | | 370 | | 0 |
| 4 | Panel D | 377 | | Panel C | 324 | Panel B | 0 | | Panel A | 0 | | 0 |
| 5 | Panel E | 377 | | Panel D | 377 | Panel C | 0 | | Panel B | 0 | | 0 |
| 6 | Panel F | 377 | | Panel E | 46 | Panel D | 0 | | Panel C | 0 | | 0 |
| 7 | Panel G | 377 | | Panel F | 108 | Panel E | 331 | | Panel D | 377 | | 0 |
| 8 | Panel H | 377 | | Panel G | 0 | Panel F | 269 | | Panel E | 377 | | 0 |
| 9 | Panel I | 377 | | Panel H | 146 | Panel G | 377 | | Panel F | 377 | | 0 |
| 10 | Panel J | 377 | | Panel I | 236 | Panel H | 231 | | Panel G | 348 | | 29 |
| 11 | Panel K | 377 | | Panel J | 123 | Panel I | 141 | | Panel H | 377 | | 0 |
| 12 | Panel L | 377 | | Panel K | 0 | Panel J | 254 | | Panel I | 377 | | 0 |
| 13 | Panel M | 377 | | Panel L | 0 | Panel K | 377 | | Panel J | 377 | | 0 |
| 14 | | 0 | | Panel M | 0 | Panel L | 377 | | Panel K | 189 | | 188 |
| 15 | | 0 | | | 0 | Panel M | 377 | | Panel L | 267 | | 110 |
| 16 | | 0 | | | 0 | | 0 | | Panel M | 0 | | 74 |

FIG. 21

|  | NECESSARY RIVETING TIME [min] | ACTUAL RIVETING TIME [min] | REMAINING WORK [min] |
| --- | --- | --- | --- |
| Panel A | 643 | 643 | 0 |
| Panel B | 1124 | 1124 | 0 |
| Panel C | 692 | 692 | 0 |
| Panel D | 701 | 701 | 0 |
| Panel E | 1462 | 1462 | 0 |
| Panel F | 1069 | 1069 | 0 |
| Panel G | 1268 | 1268 | 0 |
| Panel H | 956 | 956 | 0 |
| Panel I | 1041 | 1041 | 0 |
| Panel J | 1244 | 1244 | 0 |
| Panel K | 1442 | 1442 | 0 |
| Panel L | 1053 | 1053 | 0 |
| Panel M | 1095 | 1095 | 0 |

FIG. 22

PRODUCTION FACILITY, PRODUCTION FACILITY DESIGN METHOD, PRODUCTION FACILITY CONTROL METHOD, AND MANUFACTURING METHOD

RELATED APPLICATIONS

The present application is a National phase of International Application No. PCT/JP2016/070605, filed Jul. 12, 2016, and claims priority based on Japanese Patent Application No. 2015-162680, filed Aug. 20, 2015.

TECHNICAL FIELD

The present invention relates to production facilities, production facility design methods, production facility control methods, and manufacturing methods.

BACKGROUND ART

Production facilities (also called production lines) where items to be machined (hereinafter called "machining targets") are transported on predetermined transport paths and processed by a plurality of processing devices disposed on the transport paths are used for producing various kinds of products. The stated production lines are required to efficiently manufacture the products.

For example, Patent Literature 1 discloses a car body assembly line provided with a main line where attached are main components common to different car bodies and main components capable of absorbing a deviation in attachment-work man-hours generated due to a difference in car types, and a sub-line where attached are main components incapable of absorbing the deviation in the attachment-work man-hours generated due to the difference in car types and sub-components.

Patent Literature 2 discloses an automobile production line where assembly standby vehicle-row lanes and a buffer lane are disposed between a coating line and an assembly line. The buffer lane is configured to align vehicles selected from the assembly standby vehicle-row lanes in a row and feed out the aligned vehicles toward the assembly line on a downstream side; the order in which the vehicles are aligned in the buffer lane is carefully controlled so as to increase the operating ratio of the assembly line.

CITATION LIST

Patent Literature

Patent Literature 1: JP-A-2001-247064
Patent Literature 2: JP-A-2004-50918

SUMMARY OF INVENTION

Technical Problems

Here, for example, in an aircraft production line, a fuselage panel as a machining target is formed (processed) by driving rivets into a plurality of skins by a riveting device to join the rivets (hereinafter, referred to as "riveting"). Because a shape of each of the fuselage panels, such as a total length, total width, or the like, differs depending on respective sections, there is a case in which the number of driven rivets is significantly different depending on the fuselage panels.

Because of this, an occupation time of a processing device also differs depending on machining targets having different shapes. In other words, the number of production processes to be carried out for processing each machining target is different. For example, the numbers of processing devices used for processing the machining targets having different lengths differ as follows: that is, a machining target with a long total length is processed by two processing devices, while a machining target with a short total length is processed by a single processing device.

As such, a plurality of processing devices are provided in a production facility in some case so as to correspond to the machining target with the largest number of production processes to be carried out. However, in the case where the machining targets with different shapes are continuously transported, there arises a case in which, of the plurality of processing devices, some of the processing devices do not process the machining targets temporarily. In such a case in which a processing device not in operation is present as discussed above, the production facility cannot efficiently process the machining targets.

The present invention has been conceived in consideration of the above circumstances, and an object of the invention is to provide a production facility, a production facility design method, a production facility control method, and a manufacturing method capable of efficiently processing machining targets even when continuously processing a plurality of the machining targets having different shapes.

Solution to Problems

In order to solve the above issues, the production facility, the production facility design method, the production facility control method, and the manufacturing method of the present invention employ the following aspects.

The production facility according to a first aspect of the present invention is provided with: a transport device configured to transport a plurality of machining targets of multiple types having different shapes in a mixed state on a predetermined transport path; a plurality of processing devices configured to process the machining targets transported on the transport path; work regions preset in the transport path corresponding to the plurality of processing devices and represent ranges in which the processing devices can work to process the machining targets; and a control device configured to perform movement machining processing in which the processing device not having the machining target to process in the work region corresponding to the stated processing device is moved to another one of the adjacent work regions so as to process the machining target.

The production facility according to this configuration is provided with the transport device configured to transport the plurality of machining targets of multiple types having different shapes in a mixed state on the predetermined transport path. The machining targets are, for example, fuselage panels forming an aircraft fuselage portion, and the total lengths, total widths, or the like thereof differ depending on the shapes thereof. Processing performed on the machining target is, for example, riveting.

Further, the production facility is provided with the plurality of processing devices configured to process the machining targets transported on the transport path, and the work regions that are preset in the transport path corresponding to the plurality of processing devices and represent the ranges in which the processing devices can work to process the machining targets. That is, the processing device performs predetermined processing on the machining target that has been stopped in the work region corresponding to the stated processing device while the processing device moves in the above work region. Note that "work" and "processing" have the same meaning here. The production facility is a pulse line, for example, where predetermined is a stoppage time during which the machining target is kept being stopped at the installation position of the processing device, and the machining target is transported to a subsequent work region when the stoppage time has passed.

Then, the movement machining processing is performed by the control device. The movement machining processing is a kind of processing in which the processing device not having the machining target to process in the work region corresponding to the stated processing device is moved to another adjacent work region so as to process the machining target.

In this manner, with the above configuration, the processing device not being used to process the machining target is moved to another adjacent work region to process the machining target in the stated another work region. To rephrase, by the processing device moving beyond its original work region, the plurality of processing devices cooperate with each other to process the machining target.

As such, with the present configuration, because the operating ratio of the processing devices is increased and the plurality of processing devices cooperate with each other to perform the processing, the machining targets can be efficiently processed even in the case where the plurality of machining targets having different shapes are continuously processed.

In the above first aspect, the production facility may be provided with a spare work region preset adjacent to the work region in the transport path and to which the processing device corresponding to the above adjacent work region moves so as to process the machining target; and the movement machining processing may move the processing device, which corresponds to the work region adjacent to the spare work region, to the spare work region to process the machining target in the case where the machining target to be processed is not present in the work region adjacent to the spare work region and the machining target to be processed is present in the spare work region.

The production facility according to this configuration is provided with the spare work region that is preset adjacent to the work region in the transport path. The processing device corresponding to the work region adjacent to the spare work region moves to the spare work area so as to process the machining target therein.

The movement machining processing moves the processing device, which corresponds to the work region adjacent to the spare work region, to the spare work region to process the machining target in the case where the machining target to be processed is not present in the work region adjacent to the spare work region and the machining target to be processed is present in the spare work region. In other words, a processing device that moves only in the spare work region is not present; only in the case where the machining target is processed in the spare work region, the processing device moves to the spare work region from the adjacent work region.

In this manner, with the above configuration, because the processing device not being used to process the machining target is moved to the adjacent spare work region to process the machining target in the spare work region, the operating ratio of the processing devices is increased and the machining targets can be efficiently processed even in the case where the plurality of machining targets having different shapes are continuously processed.

In the above first aspect, the spare work region may be set between the work regions.

With this configuration, by providing the spare work region between the work regions, even if the processing device breaks down, the adjacent processing device performs the processing in place of the broken-down processing device in the spare work region, thereby making it possible to suppress the production facility itself being stopped due to the breakdown of the processing device.

In the above first aspect, in the case where the machining target capable of being processed by the plurality of processing devices is present in the work region and the machining target to be processed in another one of the other work regions adjacent to the above work region is not present, the movement machining processing may move the processing device corresponding to the stated another work region to the adjacent work region so as to process the machining target by the plurality of processing devices.

In this configuration, the processing device not being used to process the machining target is moved to the adjacent work region so that the plurality of processing devices cooperate with each other to process one machining target. As such, with the above configuration, the operating ratio of the processing devices is increased and the machining targets can be efficiently processed even in the case where the plurality of machining targets having different shapes are continuously processed.

The production facility design method according to a second aspect of the present invention is a design method which takes a time that each of the processing devices can use for processing the machining target as a set time and determines a transport order of the machining targets of multiple types so that an operating time of each of the processing devices will not exceed the above-mentioned set time in the case where the movement machining processing is performed.

This configuration makes it possible to more appropriately determine the transport order of the machining targets.

In the above second aspect, by dividing an average processing time of each of the machining targets by the above set time, a minimum number of the processing devices may be calculated and the transport order of the machining targets of multiple types may be determined based on the calculated minimum number.

With this configuration, since the plurality of machining targets having different shapes to be processed are transported, calculating the minimum number of the processing devices based on the average processing time of the machining target makes it possible to appropriately determine a necessary number of processing devices.

The production facility control method according to a third aspect of the present invention is a control method for a production facility provided with: a transport device configured to transport a plurality of machining targets of multiple types having different shapes in a mixed state on a predetermined transport path; a plurality of processing devices configured to process the machining targets transported on the transport path; and work regions that are preset in the transport path respectively corresponding to the plurality of processing devices and represent ranges in which the processing devices can work to process the machining targets, the method performs movement machining processing in which the processing device not having the machining target to process in the work region corresponding to the stated processing device is moved to another one of the adjacent work regions so as to process the machining target.

The manufacturing method according to a fourth aspect of the present invention is a manufacturing method for manufacturing the machining targets using the above-described production facility.

Advantageous Effects of Invention

The present invention provides an excellent advantage in that machining targets can be efficiently processed even in the case where the plurality of machining targets having different shapes are continuously processed.

BRIEF DESCRIPTION OF DRAWINGS

FIG. 8 is a schematic view illustrating an example of the transport order of the fuselage panels in the case where a result of the A/R simulation according to the first embodiment of the present invention is unsuccessful.

FIG. 10 is a schematic view illustrating an example of the transport order of the fuselage panels in the case where a result of the A/R simulation according to the first embodiment of the present invention is successful.

FIG. 11 is a schematic view illustrating an example of the transport order of the fuselage panels in the case where a result of the A/R simulation according to the first embodiment of the present invention is successful.

FIG. 18 is a schematic view illustrating an example of the transport order of fuselage panels in the case where a result of an A/R simulation according to the second embodiment of the present invention is unsuccessful.

FIG. 19 is a schematic view illustrating an example of the transport order of the fuselage panels in the case where a result of the A/R simulation according to the second embodiment of the present invention is unsuccessful.

FIG. 21 is a schematic view illustrating an example of the transport order of the fuselage panels in the case where a result of the A/R simulation according to the second embodiment of the present invention is successful.

FIG. 22 is a schematic view illustrating an example of the transport order of the fuselage panels in the case where a result of the A/R simulation according to the second embodiment of the present invention is successful.

DESCRIPTION OF EMBODIMENTS

Hereinafter, an embodiment of a production facility, production facility design method, production facility control method, and manufacturing method according to the present invention will be described with reference to the drawings.
First Embodiment Hereinafter, a first embodiment of the present invention will be described.

Figure 1:
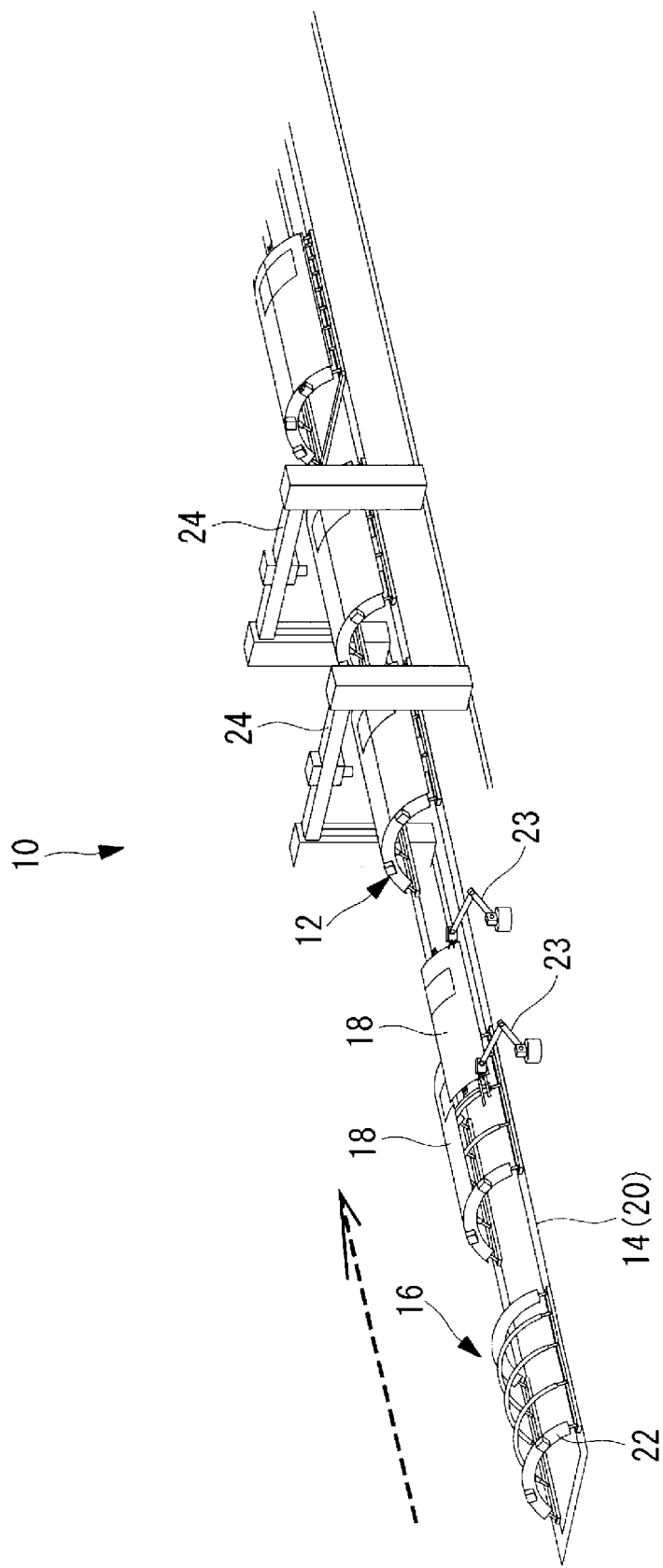
FIG. 1 is a configuration diagram illustrating a production facility according to a first embodiment of the present invention.

FIG. 1 is a configuration diagram illustrating a production facility 10 according to the first embodiment.

Although, in an example of FIG. 1, the number of lines (hereinafter, called "production lines") included in the production facility 10 is only one, two or more production lines may be provided in parallel.

The production facility 10 is provided with a transport device 16 configured to transport a plurality of machining targets 12 of multiple types having different shapes in a mixed state on a predetermined transport path 14. A total length, total width, or the like of the machining target 12 differs depending on its shape, whereby a machining position, the number of pieces of processing, or the like of the machining target 12 differs accordingly. In addition, the machining position, the number of pieces of processing, or the like of the machining target 12 differs in some cases even if the machining targets 12 have the same shape. The machining target 12 is, for example, a fuselage panel forming an aircraft fuselage portion, and the fuselage panel is formed of a plurality of (two or three) skins 18, and the like. In other words, the machining targets 12 of multiple types are transported in a mixed state (also called a mixed flow state) on a single line.

Processing performed on the machining target 12 is riveting thereof in which rivets are driven into the machining target 12 to establish the joining, for example. Further, in the production facility 10 according to the present embodiment, rails (rail track) 20 are provided as the transport path 14, and an automatic guide vehicle (hereinafter, referred to as "AGV") is used as the transport device 16. The transport device 16 is provided with a jig 22, and the machining target 12 is fixed to the transport device 16 with the jig 22. Note that the jig 22 is, for example, a shared jig capable of fixing the machining targets 12 even if types thereof (the total length, total width, and the like) differ.

Figure 2:
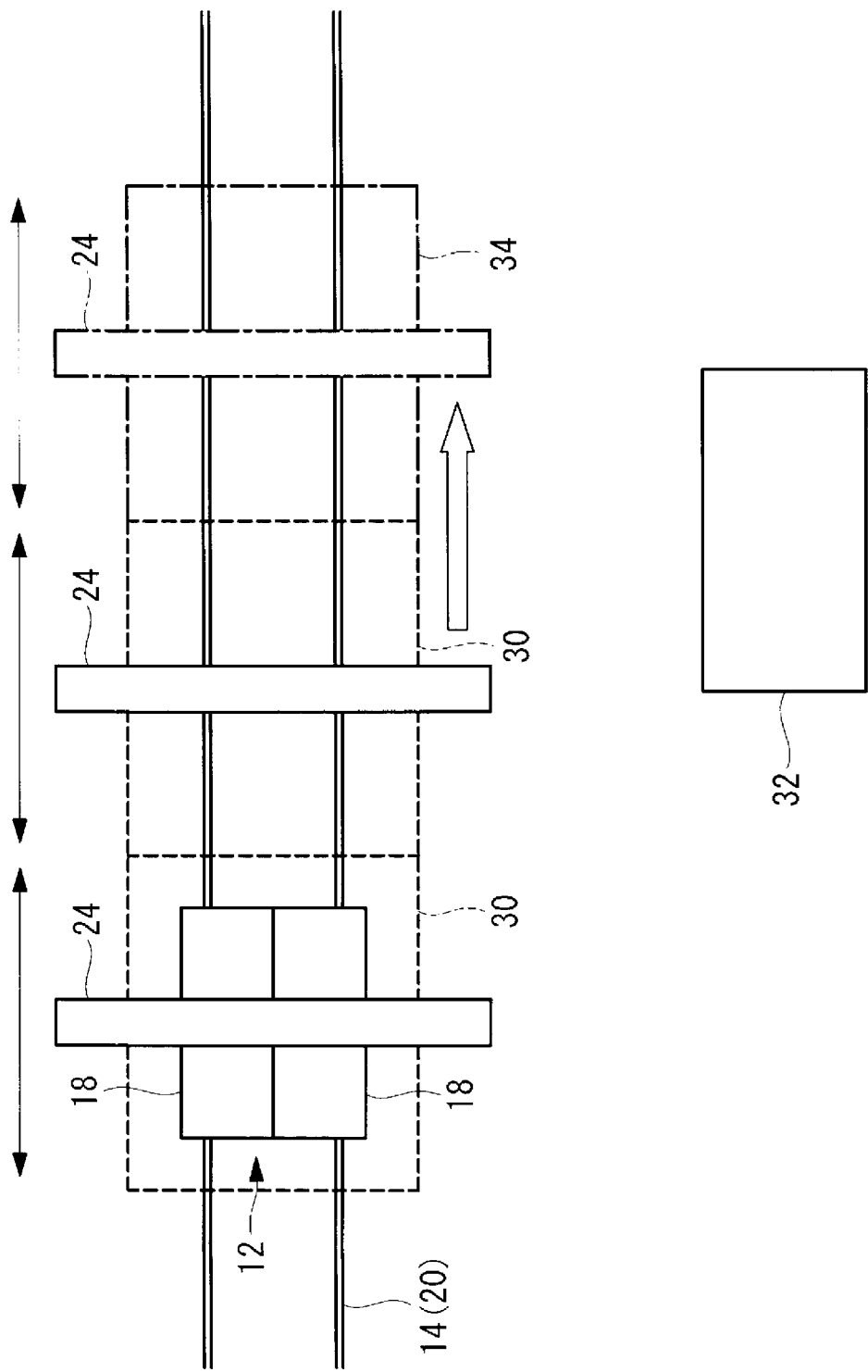
FIG. 2 is a schematic view illustrating A/Rs, work areas, and a buffer area according to the first embodiment of the present invention.

Further, the production facility 10 is provided with a plurality of processing devices 24 configured to process the machining targets 12 having been transported and stopped on the transport path 14. The processing device 24 is, for example, a portal type automatic riveting device (hereinafter, referred to as "A/R"). The processing device 24 is provided with wheels or the like on a bottom portion and is capable of self-propelled movement. As illustrated in FIG. 2, the processing device 24 is disposed in each of work regions (hereinafter, referred to as "work areas") 30.

The production facility 10 according to the first embodiment is what is called a pulse line, where a stoppage time during which the machining target 12 is kept being stopped at the installation position (work area) of the processing device 24 is predetermined, and the machining target 12 is transported to a subsequent work area 30 when the stoppage time has passed. In other words, each of the processing devices 24 is required to process the machining target 12 within the stoppage time as a predetermined constant time. The stoppage time is always the same regardless of the types of the machining targets 12.

Further, in the production facility 10, as also illustrated in FIG. 2, the work area 30 is preset corresponding to each of the processing devices 24 in the transport path 14. The work area 30, in which a stoppage position of the machining target 12 is set, represents a range in which each of the processing devices 24 can work to process the machining target 12 being stopped. Note that "work" and "processing" have the same meaning here. To rephrase, the machining targets 12 are manufactured by the production facility 10.

In the following description, expressions of Pos. 1, 2, 3, . . . , which indicate the work areas 30 or the installation positions of the processing devices 24 (In FIG. 3, FIG. 4, and the like to be described later) are also used. In the case of using the above expressions, as the final number is larger, indicated is the work area 30 or the installation position corresponding to the processing device 24 installed on a further downstream side in a transport direction of the machining target 12.

The transport device 16 and the processing devices 24 are controlled by a control device 32. The control device 32 controls the stoppage time of the transport device 16 having reached the work area 30, the processing performed on the machining target 12 by the processing device 24 (machining position), or the like.

In the following explanation, descriptions will be given while taking the machining target 12 according to the first embodiment as the fuselage panel 12, the transport device 16 as an AGV 16, and the processing device 24 as an A/R 24.

For example, as illustrated in FIG. 1, the plurality of skins 18 and the like are placed by robots 23 on the jigs 22 included in the AGV 16, and the AGV 16 moves on rails 20. Then, when the AGV 16 stops at the stoppage position corresponding to each of the A/Rs 24, each of the A/Rs 24 forms the fuselage panel 12 by riveting the skins 18 together while moving in the work area 30 corresponding to each of the A/Rs 24.

In the case where the fuselage panel 12 is processed by riveting using the A/R 24, the control device 32 performs movement machining processing (manufacture of the fuselage panel 12).

The movement machining processing according to the first embodiment is a kind of processing in which the A/R 24 having no fuselage panel 12 to rivet in the work area 30 corresponding to the stated A/R 24 is moved to another adjacent work area 30 (a buffer area to be explained later) to rivet the fuselage panel 12.

In other words, the movement machining processing moves the A/R 24 being not used for riveting the fuselage panel 12 to another adjacent work area 30 to cause the moved A/R 24 to rivet the fuselage panel 12 in the stated another work area 30; to rephrase, by the A/R 24 moving beyond its original work region, the plurality of A/Rs 24 cooperate with each other to rivet the fuselage panel 12. Accordingly, by the movement machining processing being performed, because the operating ratio of the A/R 24 is increased and the plurality of A/Rs 24 cooperate with each other to perform the riveting, the fuselage panels 12 can be efficiently riveted even in the case where the plurality of fuselage panels 12 having different shapes are continuously riveted.

Next, the movement machining processing (hereinafter, referred to as "buffer area movement processing") according to the first embodiment will be described in detail.

In the production facility 10 according to the first embodiment, a spare work region (hereinafter, referred to as "buffer area") 34 adjacent to the work area 30 is set in advance in the transport path 14, as illustrated in FIG. 2. The buffer area 34 is a region to which the A/R 24 corresponding to the adjacent work area 30 is moved so as to rivet the fuselage panel 12. The buffer area 34 is set adjacent to the work area 30 on the downstream side in the transport direction of the fuselage panel 12, for example.

In the case where no fuselage panel 12 to be riveted is present in the work area 30 adjacent to the buffer area 34 and the fuselage panel 12 to be riveted is present in the buffer area 34, the buffer area movement processing moves the A/R 24, which corresponds to the work area 30 adjacent to the buffer area 34, to the buffer area 34 to rivet the fuselage panel 12. In other words, although the buffer area 34 serves as the work area 30 as well, there is not any A/R 24 that moves only in the buffer area 34; the A/R 24 moves to the buffer area 34 from the adjacent work area 30 only in the case where the fuselage panel 12 is riveted in the buffer area 34.

Figure 3:
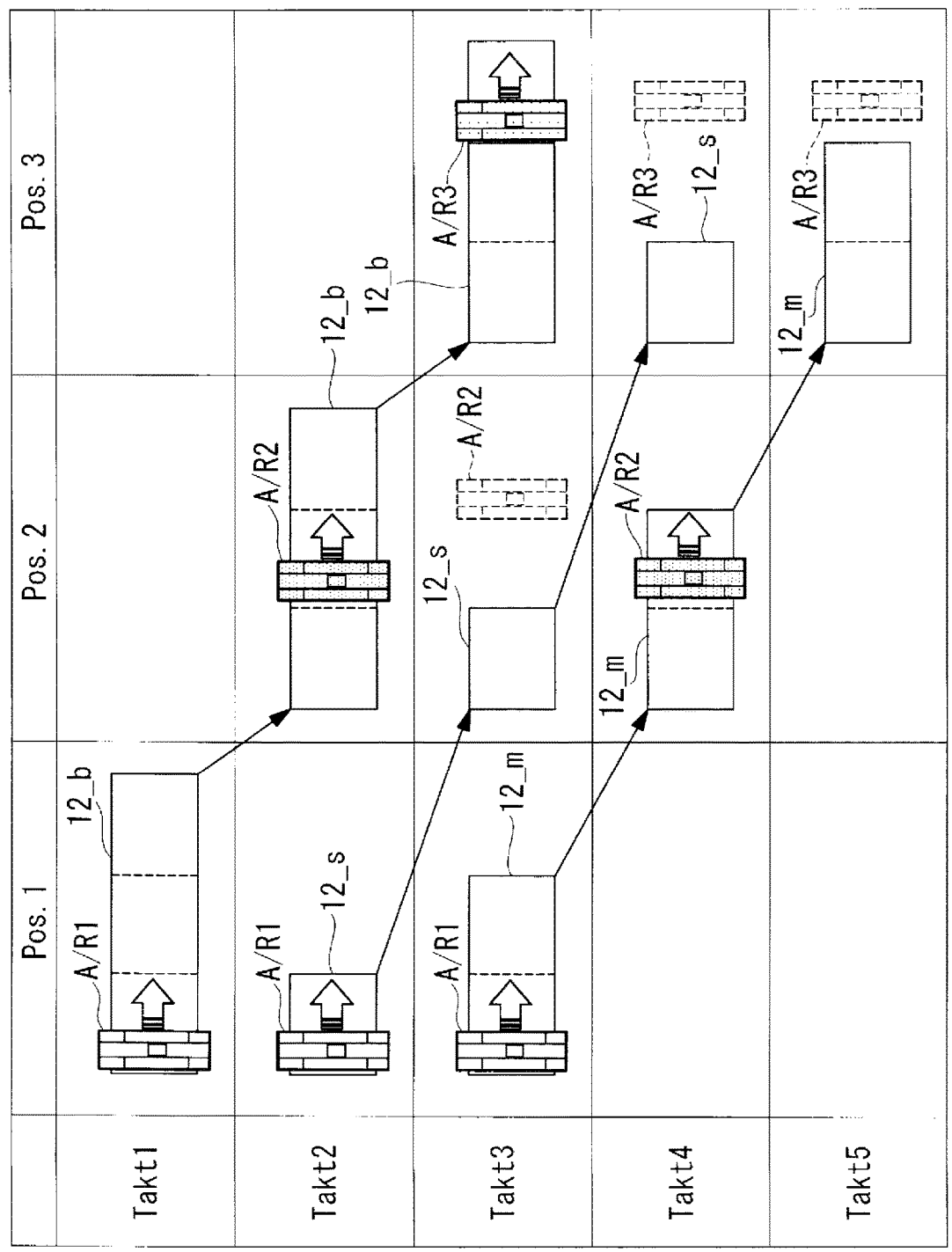
FIG. 3 is a schematic view illustrating operating states of the A/Rs in a case where no buffer area is provided.
Figure 4:
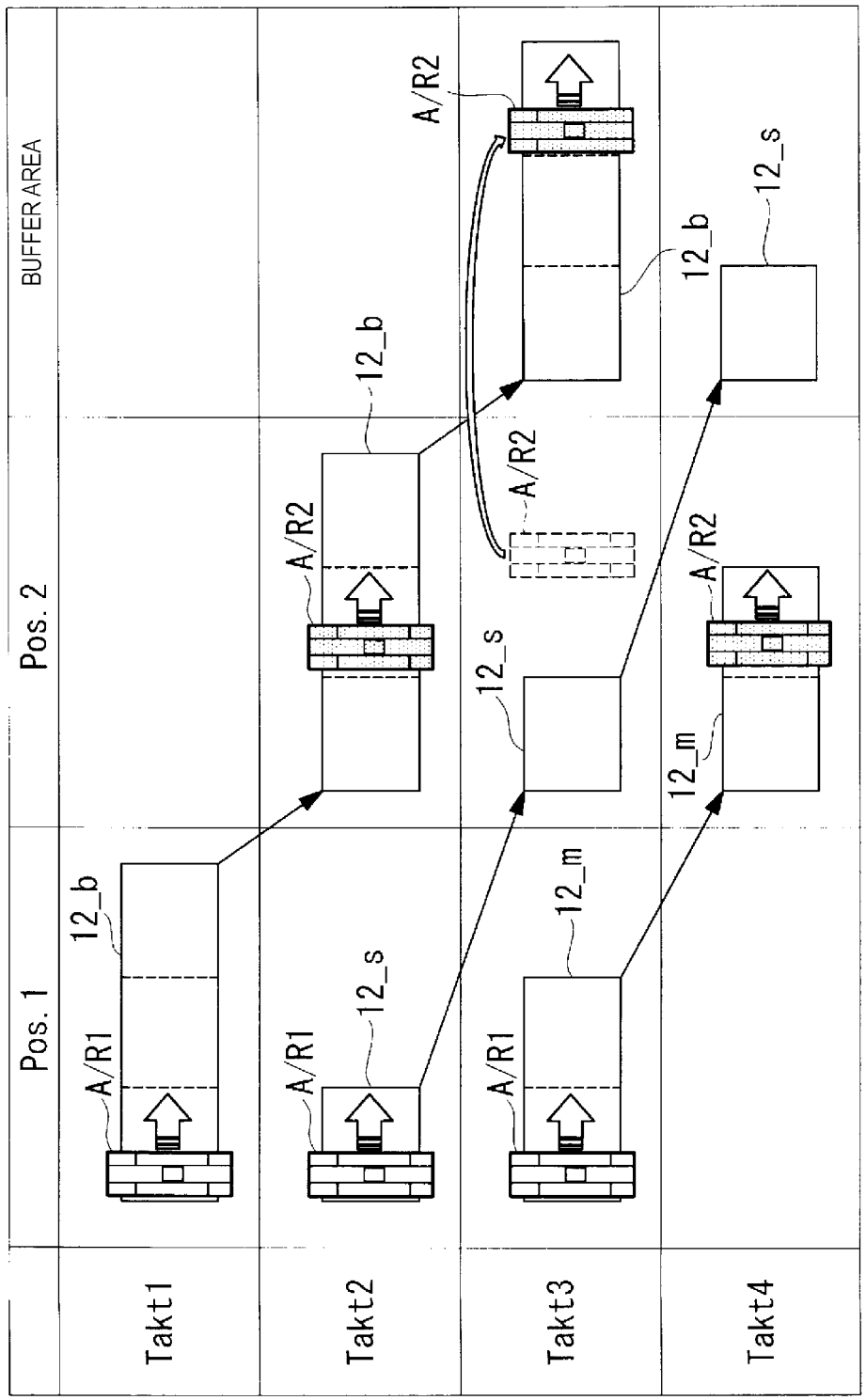
FIG. 4 is a schematic diagram illustrating operating states of the A/Rs in a case where a buffer area according to the first embodiment of the present invention is provided.

With reference to FIGS. 3 and 4, a difference in operating states as well as a difference in operating ratios of the A/Rs 24 between a case of the buffer area 34 being absent and a case of the buffer area 34 being present will be described below.

FIG. 3 is a schematic view illustrating the operating states of the A/Rs 24 in the case where the buffer area 34 is absent, while FIG. 4 is a schematic view illustrating the operating states of the A/Rs 24 in the case where the buffer area 34 according to the first embodiment is present.

In FIGS. 3 and 4, lateral rows represent positions of the respective A/Rs 24, while longitudinal rows (Takt1 to Takt5 or Takt1 to Takt4) represent contents of the production processes carried out in the work areas 30 (Pos. 1 to Pos. 3) and the buffer area 34, in other words, the passage of time (also called a "takt time"). In examples of FIGS. 3 and 4, there are three types of fuselage panels 12 having different total lengths (large, medium, small); riveting of the large fuselage panel 12 is completed by the amount of work equivalent to three times a takt time, riveting of the medium fuselage panel 12 is completed by the amount of work equivalent to two times the takt time, and riveting of the small fuselage panel 12 is completed by the amount of work equivalent to one time the takt time. That is, the riveting of the large fuselage panel 12 is completed by the three A/Rs 24, the riveting of the medium fuselage panel 12 is completed by the two A/Rs 24, and the riveting of the small fuselage panel 12 is completed by a single A/R 24. Note that in the following explanation, the large fuselage panel 12 is described as a fuselage panel 12_b, the medium fuselage panel 12 is described as a fuselage panel 12_m, and the small fuselage panel 12 is described as a fuselage panel 12_s. Further, the A/R 24 corresponding to Pos. 1 is described as an A/R1, the A/R 24 corresponding to Pos. 2 is described as an A/R2, and the A/R 24 corresponding to Pos. 3 is described as an A/R3.

In the example of FIG. 3, the three A/Rs 24 are provided in the production facility 10, and large, small, and medium fuselage panels 12 are transported on the transport path 14 in this order.

At Takt1 in FIG. 3, the large fuselage panel 12_b is transported and stopped in Pos. 1, and one third of the total length of the fuselage panel 12_b is riveted by the A/R1 within the stoppage time (constant time).

Subsequently, at Takt2, the small fuselage panel 12_s is transported and stopped in Pos. 1, and the riveting of the fuselage panel 12_s is completed by the A/R1 within the stoppage time. Further, the fuselage panel 12_b from Pos. 1 is transported and stopped in Pos. 2, and a subsequent one third of the fuselage panel 12_b is riveted by the A/R2.

Next, at Takt3, the medium fuselage panel 12_m is transported and stopped in Pos. 1, and half of the total length of the fuselage panel 12_m is riveted by the A/R1 within the stoppage time. Although the fuselage panel 12_s from Pos. 1 is transported and stopped in Pos. 2, the A/R2 does not operate because the riveting thereof has already been completed. Further, the fuselage panel 12_b from Pos. 2 is transported and stopped in Pos. 3, and the remaining one third of the fuselage panel 12_b is riveted by the A/R3, thereby completing the riveting of the fuselage panel 12_b.

Next, at Takt4, the fuselage panel 12_m from Pos. 1 is transported and stopped in Pos. 2, and the remaining half of the fuselage panel 12_m is riveted by the A/R2, thereby completing the riveting of the fuselage panel 12_m. Although the fuselage panel 12_s from Pos. 2 is transported and stopped in Pos. 3, the A/R3 does not operate because the riveting thereof has already been completed.

Next, at Takt5, although the fuselage panel 12_m from Pos. 2 is transported and stopped in Pos. 3, the A/R3 does not operate because the riveting thereof has already been completed.

As discussed above, in the example of FIG. 3 in which the large, small, and medium fuselage panels 12 are transported in this order, the operating ratio of the A/Rs 24 is 67%.

Meanwhile, in the example of FIG. 4, the buffer area 34 along with the two A/Rs 24 are provided in the production facility 10, and the large, small, and medium fuselage panels 12 are transported on the transport path 14 in this order similar to that in FIG. 3. Note that the buffer area 34 is set in the position of Pos. 3 in FIG. 3. That is, as discussed above, because there is no A/R 24 configured to move only in the buffer area 34, the two A/Rs 24 are positioned in Pos. 1 and Pos. 2, respectively, and the A/R2 positioned in Pos. 2 is capable of moving to the buffer area 34 as well in the example of FIG. 4.

At Takt1 in FIG. 4, the large fuselage panel 12_b is transported and stopped in Pos. 1, and one third of the total length of the fuselage panel 12_b is riveted by the A/R1 within the stoppage time.

Subsequently, at Takt2, the small fuselage panel 12_s is transported and stopped in Pos. 1, and the riveting of the fuselage panel 12_s is completed by the A/R1 within the stoppage time. Further, the fuselage panel 12_b from Pos. 1 is transported and stopped in Pos. 2, and a subsequent one third of the fuselage panel 12_b is riveted by the A/R2.

Next, at Takt3, the medium fuselage panel 12_m is transported and stopped in Pos. 1, and half of the total length of the fuselage panel 12_m is riveted by the A/R1 within the stoppage time. Although the fuselage panel 12_s from Pos. 1 is transported and stopped in Pos. 2, the fuselage panel 12 to be riveted in Pos. 2 by the A/R2 is not present because the riveting of the fuselage panel 12_s has already been completed. Further, the fuselage panel 12_b from Pos. 2 is transported and stopped in the buffer area 34.

At this Takt3, because the fuselage panel 12 to be riveted by the A/R2 is not present in Pos. 2, the A/R2 moves to the buffer area 34 to rivet the remaining one third of the fuselage panel 12_b. With this, the riveting of the fuselage panel 12_b is completed at Takt3.

Next, at Takt4, the fuselage panel 12_m from Pos. 1 is transported and stopped in Pos. 2, and the remaining half of the fuselage panel 12_m is riveted by the A/R2, thereby completing the riveting of the fuselage panel 12_m. Although the fuselage panel 12_s from Pos. 2 is transported and stopped in the buffer area 34, the A/R2 does not move from Pos. 2 to the buffer area 34 because the riveting thereof has already been completed.

In the example of FIG. 4, because the production process carried out until the riveting of the large, small, and medium fuselage panels 12 are completed is short in length and the operating ratio of the A/Rs 24 is also increased (operating ratio is 100%) in comparison with the example of FIG. 3, the number of A/Rs 24 can be less.

As discussed above, with the production facility 10 according to the first embodiment, because the A/R 24 being not used for riveting the fuselage panel 12 is moved to the adjacent buffer area 34 so as to rivet the fuselage panel 12 in the buffer area 34, the operating ratio of the A/Rs 24 is increased and the fuselage panels 12 can be efficiently riveted even in the case where the plurality of fuselage panels 12 having different shapes are continuously riveted.

Note that in the example of FIG. 4, in the case where the fuselage panel 12 to be riveted is not present in Pos. 2, the A/R2 moves to the buffer area 34 to rivet the fuselage panel 12. However, the embodiment is not limited thereto; in the case where the stoppage time of the fuselage panel 12 is still left after the riveting of the fuselage panel 12 being finished by the A/R 24 in Pos. 2, and the fuselage panel 12 to be riveted is present in the buffer area 34, the A/R 24 in Pos. 2 may move to the buffer area 34 and further rivet another fuselage panel 12.

The buffer area 34 may be set between the work areas 30, in other words, between the A/Rs 24.

For example, in the case where the A/R 24 corresponding to the work area 30 on the upstream side breaks down and cannot perform riveting, or the like, the A/R 24 on the downstream side may move to the buffer area 34 and rivet the fuselage panel 12 in the buffer area 34 in place of the broken-down A/R 24. In this case, the A/R 24 having moved to the buffer area 34 returns, after the riveting being finished in the buffer area 34, to the work area 30 corresponding to the stated A/R 24 and rivets the fuselage panel 12 therein again.

In this manner, by providing the buffer area 34 between the work areas 30, even if the A/R 24 breaks down, the adjacent A/R 24 performs riveting in place of the broken-down A/R 24 in the buffer area 34, thereby making it possible to suppress the production facility 10 itself being stopped due to the breakdown of the A/R 24.

A production facility design process in which the number of buffer areas 34 (hereinafter, referred to as "buffer area number") and the transport order of the fuselage panels 12 of multiple types are determined will be described next. In other words, the production facility design process is a process carried out in designing the production facility 10, where the number of buffer areas 34, the transport order of the fuselage panels 12, and the like are determined in accordance with a result of the production facility design process.

Figure 5:
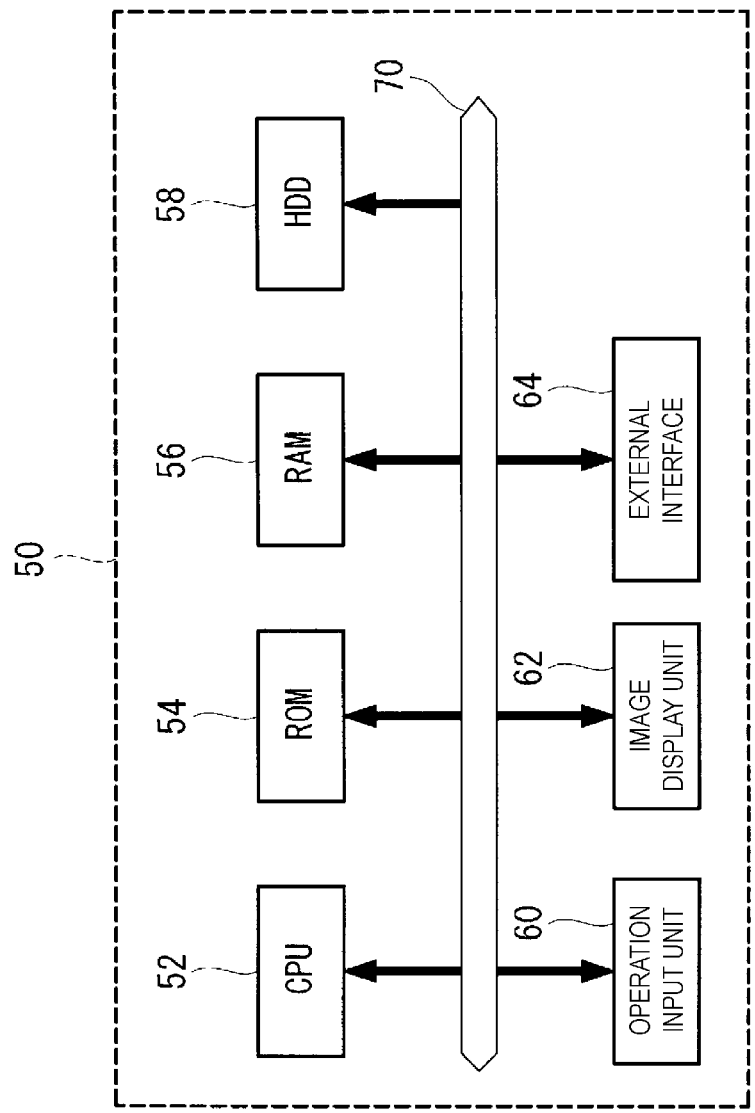
FIG. 5 is a block diagram illustrating an electrical configuration of an information processing device configured to carry out a production facility design process according to the first embodiment of the present invention.

FIG. 5 is a block diagram illustrating an electrical configuration of an information processing device 50 (computer) configured to carry out the production facility design process according to the first embodiment.

The information processing device 50 according to the present embodiment is provided with a CPU (Central Processing Unit) 52 configured to manage the overall operation of the information processing device 50, a ROM (Read Only Memory) 54 in which various kinds of programs and various kinds of data are stored in advance, a RAM (Random Access Memory) 56 used as a work area or the like when the CPU 52 executes the various kinds of programs, and an HDD (Hard Disk Drive) 58 serving as a storage unit to store the various kinds of programs such as a program for carrying out the production facility design process, and the various kinds of data.

Further, the information processing device 50 is provided with an operation input unit 60 that is configured of a keyboard, mouse, and the like and receives the input of various kinds of operations, an image display unit 62 such as a liquid crystal display unit or the like configured to display various kinds of images, and an external interface 64 that is connected to other information processing devices or the like via communication lines and sends/receives various kinds of data to/from the other information processing devices or the like.

The CPU 52, ROM 54, RAM 56, HDD 58, operation input unit 60, image display unit 62, and external interface 64 are electrically connected to each other via a system bus 70. As such, the CPU 52 can access the ROM 54, RAM 56, and HDD 58, grasp an operation state with respect to the operation input unit 60, display images on the image display unit 62, send/receive various kinds of data to/from the other information processing devices or the like via the external interface 64, and the like.

Figure 6:
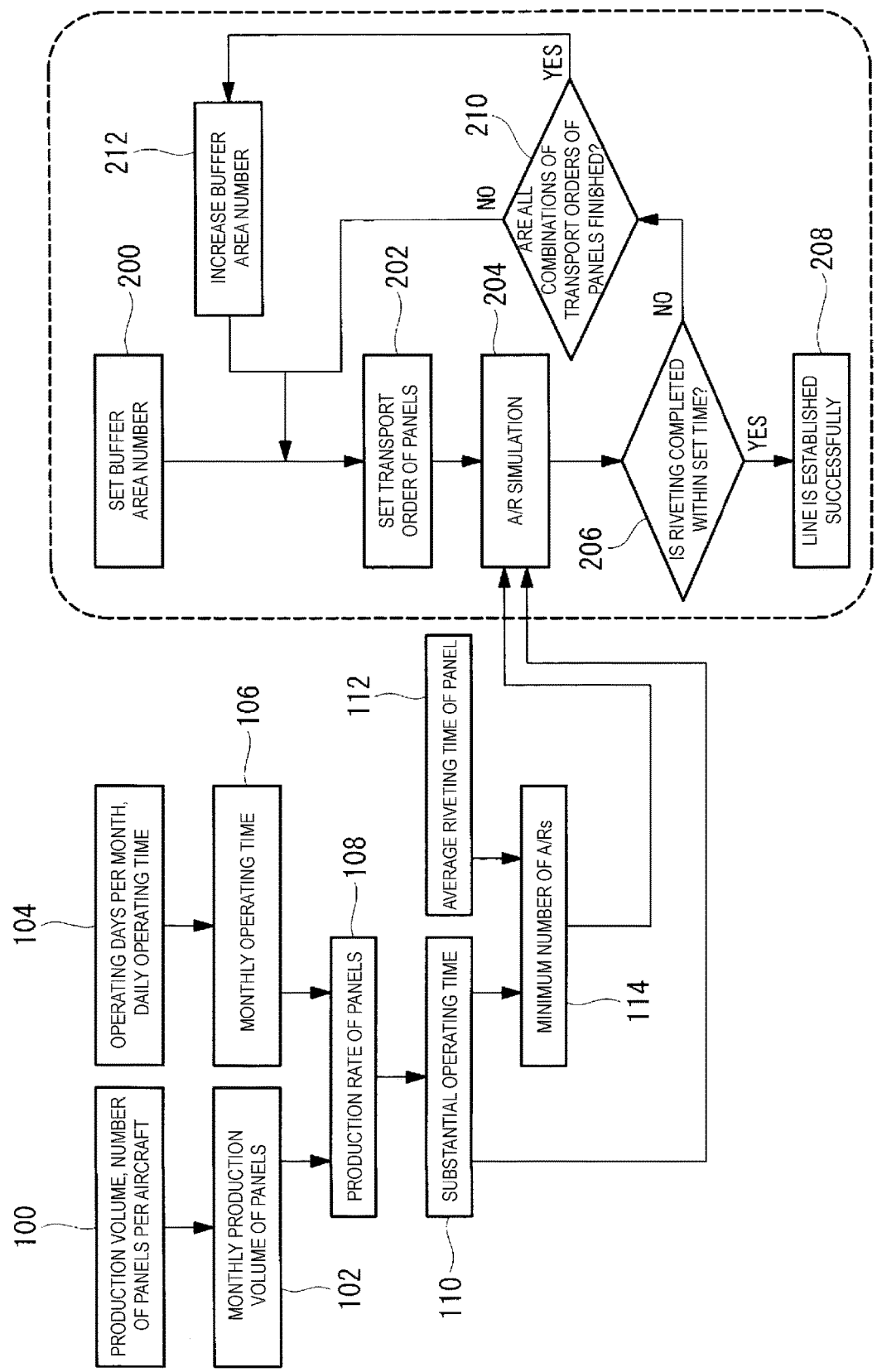
FIG. 6 is a flowchart illustrating the flow of the production facility design process according to the first embodiment of the present invention.

FIG. 6 is a flowchart illustrating the flow of a program executed by the information processing device 50 when the production facility design process according to the first embodiment is carried out.

In step 100, a monthly production volume of aircraft fuselage portions (number of production aircrafts) and the number of fuselage panels 12 needed per aircraft are inputted.

Subsequently, in step 102, a monthly production volume of the fuselage panels 12 is calculated based on the values inputted in step 100, and then the flow goes to step 108.

For example, in the case where the monthly production volume of the aircraft fuselage portions is 4.15 portions and the number of fuselage panels 12 needed per aircraft is 13 panels, the monthly production volume of the fuselage panels 12 (number of fuselage panels processed) is 54 panels per month.

In step 104, the number of operating days per month of the production facility 10 and a daily operating time thereof are inputted.

Subsequently, in step 106, a monthly operating time of the production facility 10 is calculated based on the values inputted in step 104, and then the flow goes to step 108.

For example, in the case where the number of operating days per month is 20 days and the daily operating time is 20 hours, the monthly operating time is 400 hours per month.

Next, a time that can be used for riveting the one fuselage panel 12 (hereinafter called "production rate") is calculated in step 108. The production rate is calculated from the monthly production volume calculated in step 104 and the monthly operating time calculated in step 106.

For example, in the case where the monthly production volume is 54 panels and the monthly operating time is 400 hours, the production rate is 444 minutes per panel (7.4 hours/panel=400/54). The stated production rate is what is called a takt time, which is the time each of the A/Rs 24 can use for riveting the fuselage panel 12.

Subsequently, in step 110, in consideration of a risk of the production facility 10 being stopped due to a trouble or the like, a value is calculated in which the production rate having been calculated in step 108 is multiplied by a predetermined value; then, the flow goes to step 114. The above-mentioned predetermined value is an estimated operating ratio of the production facility 10, and is 0.85, for example. Accordingly, in the case where the production rate is 444 minutes per panel, the value calculated in step 108 is 377 minutes per panel.

This value represents a substantial operating time during which one single A/R 24 can rivet the fuselage panel 12, and is set as a set operating time in an A/R simulation.

In step 112, an average riveting time of each of the fuselage panel 12 is inputted; then, the flow goes to step 114. Note that the average riveting time is obtained in advance.

In step 114, the average riveting time inputted in step 112 is divided by the set operating time calculated in step 110, thereby calculating the minimum number of necessary A/Rs 24. Because the plurality of fuselage panels 12 having different shapes are transported to the production facility 10, calculating the minimum number of A/Rs 24 based on the average riveting time of the fuselage panel 12 makes it possible to appropriately determine the necessary number of A/Rs 24.

For example, in the case where the average riveting time is 1061 minutes per panel and the set operating time is 377 minutes per panel, the minimum number of A/Rs 24 is three (2.8 A/Rs=1061/377).

The minimum number of A/Rs 24 may be calculated in step 114 using the production rate having been calculated in step 108 without executing step 110. In this case, the production rate is taken as the set operating time.

Then, the number of buffer areas 34 and the transport order of the fuselage panels 12 are determined by simulation using the minimum number of A/Rs 24 having been calculated in step 114.

First, a buffer area number $N_B$ is set in step 200. As an initial value, 1 is set for the buffer area number $N_B$ ($N_B=1$). The buffer area 34 is set adjacent to the work area 30, which is positioned on the most downstream side in the transport direction of the fuselage panel 12, on a further downstream side relative to the stated work area 30, for example.

Next, the transport order of the fuselage panels 12 is set in step 202. The transport order of the fuselage panels 12 may be set at random, or set based on a predetermined regulation (rule), for example.

Subsequently, in step 204, simulation of the production facility 10 (hereinafter called "A/R simulation") is carried out based on the set operating time calculated in step 110, the number of A/Rs 24 determined in step 114, the buffer area number $N_B$ set in step 200, and the transport order of the fuselage panels 12 set in step 202.

In the A/R simulation, amounts of time are calculated that are consumed in riveting the fuselage panels 12 by the A/Rs 24 until the riveting of all the fuselage panels 12 is completed.

Next, in step 206, it is determined whether or not the A/Rs 24 have completed the riveting of the fuselage panels 12 within the set operating time in all the production processes (Takts). In other words, in the production facility design process, the transport order of the fuselage panels 12 is determined so that the operating time of each A/R 24 will not exceed the set operating time.

If an affirmative determination is given in step 206, the flow goes to step 208.

In step 208, based on the recognition that the production line is successfully established with the set buffer area number $N_B$ as well as the set transport order of the fuselage panels 12, the successful A/R simulation result is stored in the HDD 58. Thereafter, based on the successful A/R simulation result, the production facility 10 is manufactured.

On the other hand, if a negative determination is given in step 206, the flow goes to step 210.

In step 210, it is determined whether or not the A/R simulation has been carried out and finished in consideration of all the combinations of the transport orders of the fuselage panels 12; then, the flow goes to step 212 if the determination is affirmative. On the other hand, the flow goes to step 202 if the determination is negative, and another transport order, different from the transport orders of the fuselage panels 12 set in the past in the simulation, is set again; then, the A/R simulation is carried out again.

In step 212, because no successful solution is obtained with the set buffer area number $N_B$ and the set transport order of the fuselage panels 12, the buffer area number $N_B$ is set to be increased by 1 ($N_B$=$N_B$+1). Note that the additional buffer area 34 is newly set between the work area 30 on the downstream side and the work area 30 adjacent to the above work area 30.

When the setting in step 212 is completed, the flow goes to step 202, where the transport order of the fuselage panels 12 is set; then, the A/R simulation is carried out again in step 204.

Figure 7:
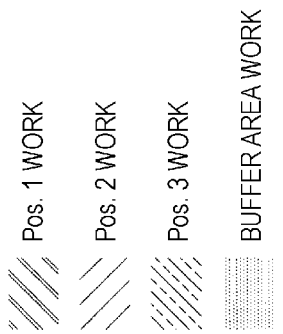
FIG. 7 is a schematic view illustrating an example of a transport order of fuselage panels in the case where a result of an A/R simulation according to the first embodiment of the present invention is unsuccessful.
Figure 9:
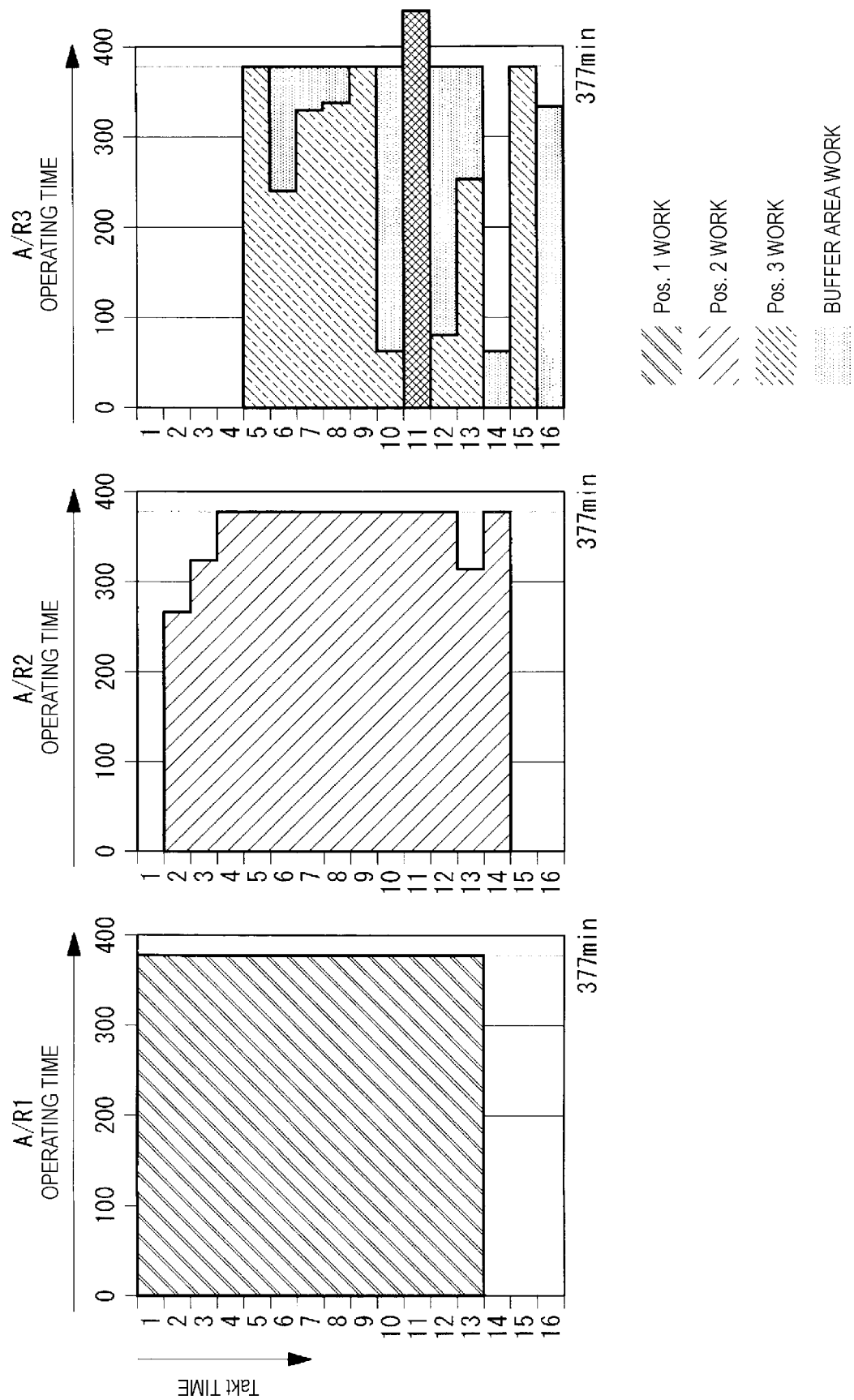
FIG. 9 is a schematic view illustrating an example of the transport order of the fuselage panels in the case where a result of the A/R simulation according to the first embodiment of the present invention is unsuccessful.

FIG. 7 to FIG. 9 illustrate an example of the transport order of the fuselage panels 12 in the case where a result of the A/R simulation is unsuccessful. In the example of FIG. 7 to FIG. 9, the three A/Rs 24 are set and the one buffer area 34 is set on the downstream side of Pos. 3.

FIG. 7 illustrates amounts of time (operating time) consumed in riveting the fuselage panels 12 (13 panels (fuselage panels A to M) as an example) by the respective A/Rs 24 at each Takt.

As illustrated in FIG. 7, at Takt1*l*, the A/R3 rivets the fuselage panel J in the buffer area 34; however, the operating time calculated by the A/R simulation is 428 minutes, which exceeds 377 minutes as the substantial operating time (set operating time).

FIG. 8 is a schematic view illustrating riveting times (necessary riveting times) needed for each of the fuselage panels A to M, calculated riveting times (actual riveting times), and differences in time (remaining work) between the necessary riveting times and the actual riveting times.

As illustrated in FIG. 8, all the necessary riveting times and actual riveting times match each other as for the fuselage panels 12 other than the fuselage panel J so that the remaining work is 0; however, as for the fuselage panel J, there is 51 minute remaining work.

FIG. 9 is a schematic view illustrating respective operating times of the A/R1 to A/R3. All the operating times of the A/R1 and A/R2 in the A/R simulation result are within the substantial operating time (377 minutes). On the other hand, the operating time of the A/R3 at Takt1*l* exceeds 377 minutes.

Figure 12:
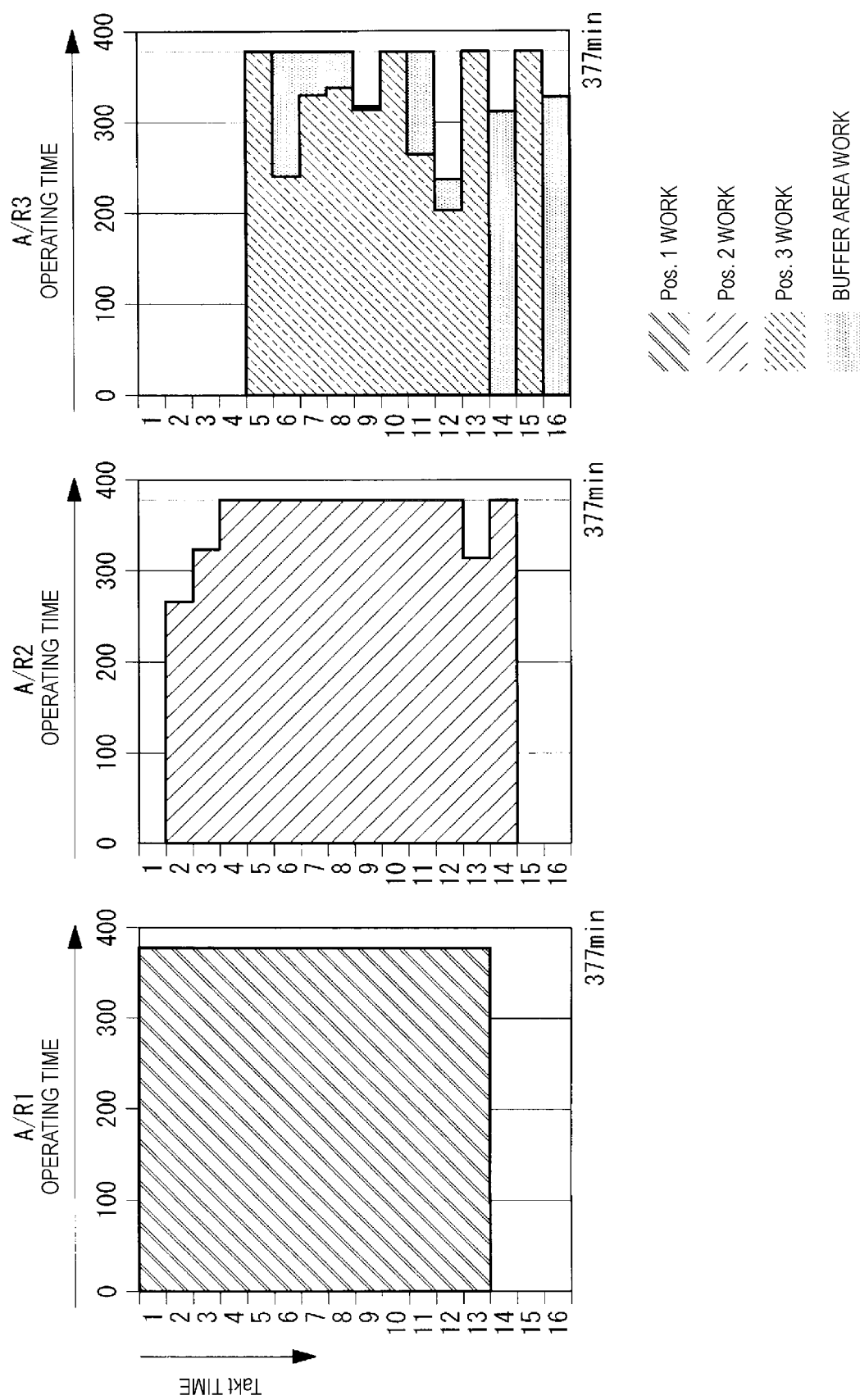
FIG. 12 is a schematic view illustrating an example of the transport order of the fuselage panels in the case where a result of the A/R simulation according to the first embodiment of the present invention is successful.

Meanwhile, FIG. 10 to FIG. 13 illustrate an example of the transport order of the fuselage panels 12 in the case where a result of the A/R simulation is successful, and FIG. 10 corresponds to FIG. 7, FIG. 11 corresponds to FIG. 8, and FIG. 12 corresponds to FIG. 9.

As illustrated in FIG. 10, since the result of the A/R simulation is successful, there is no Takt at which the operating time of the A/R 24 exceeds the substantial operating time.

As illustrated in FIG. 11, since the result of the A/R simulation is successful, all the necessary riveting times and actual riveting times match each other across all the fuselage panels 12 so that the remaining work is 0 minute.

As illustrated in FIG. 12, since the result of the A/R simulation is successful, the operating times of all the A/Rs 24 are within the substantial operating time (377 minutes).

Figure 13:
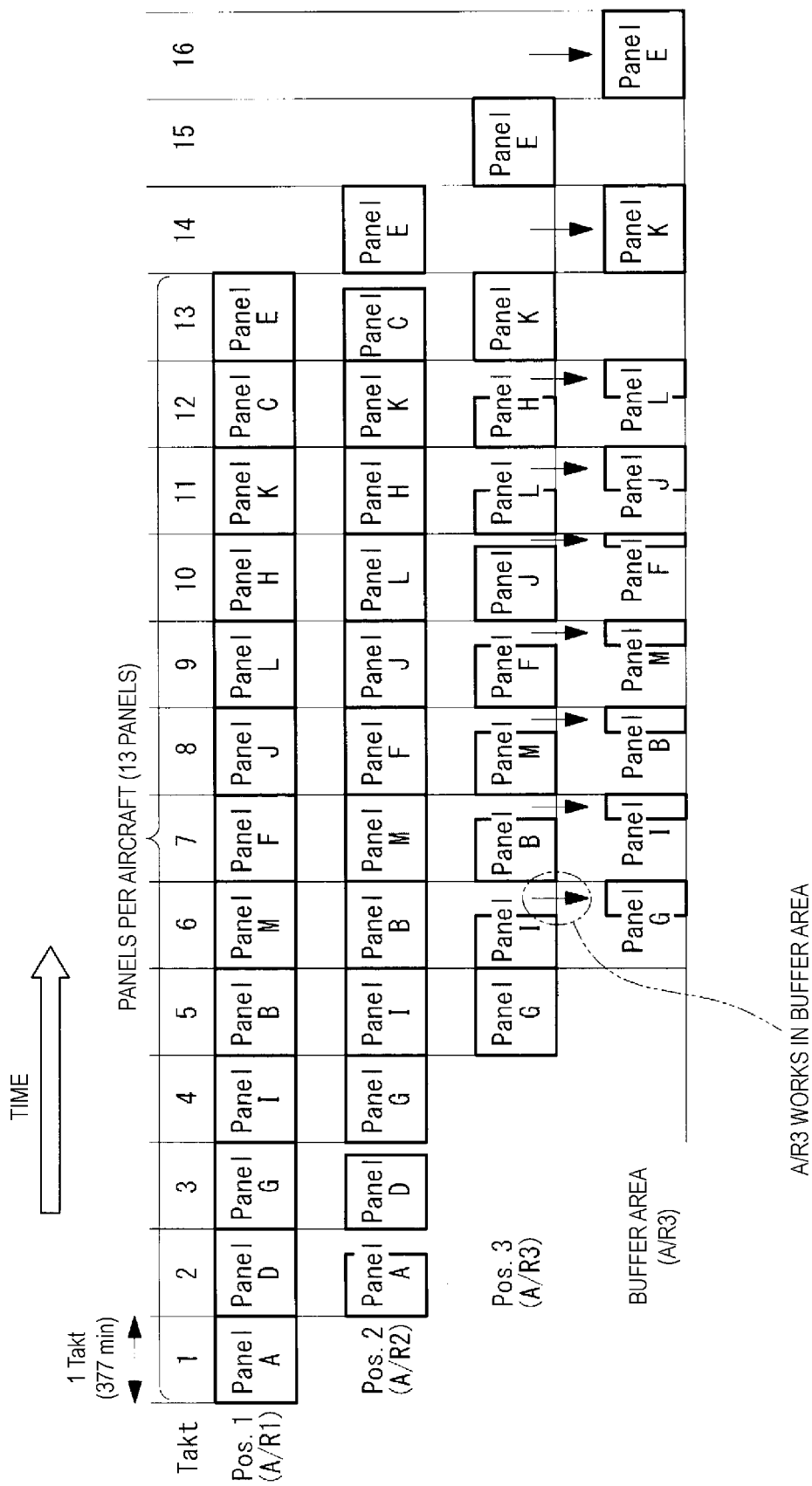
FIG. 13 is a schematic view illustrating an example of the transport order of the fuselage panels in the case where a result of the A/R simulation according to the first embodiment of the present invention is successful.

FIG. 13 is a schematic view illustrating: the fuselage panels 12 riveted in the work areas 30 (Pos. 1 to Pos. 3), and the buffer area 34 to which the A/Rs 24 respectively correspond; and a transport state of each of the fuselage panels 12.

As illustrated in FIG. 13, at Takt6, the A/R3 rivets the fuselage panel G in the buffer area 34 after riveting the fuselage panel I in Pos. 3. Likewise, at Takt7 to Takt12, the A/R3 rivets the fuselage panels I, B, M, F, J, and L in the buffer area 34 after riveting the fuselage panels B, M, F, J, L, and H in Pos. 3. At Takt14, because the fuselage panel 12 to be riveted is not present in Pos. 3, the A/R3 rivets the fuselage panel K in the buffer area 34. Further, at Takt16, because the fuselage panel 12 to be riveted is not present in Pos. 3, the A/R3 rivets the fuselage panel E in the buffer area 34, thereby completing the riveting of all the fuselage panels 12 within the set operating time.

Note that in the production facility design process, in order to more efficiently form the fuselage panels 12, the A/R simulation may be carried out such that part of the riveting work by the A/R 24 on the upstream side, which is completed if attempted, is left incomplete on purpose and the A/R 24 on the downstream side carries out the remaining riveting work.

As discussed thus far, the production facility 10 according to the first embodiment is provided with: the AGV 16 configured to transport the plurality of fuselage panels 12 of multiple types having different shapes in a mixed state on the predetermined transport path 14; the plurality of A/Rs 24 configured to rivet the fuselage panels 12 transported on the transport path 14; and the work areas 30 that are preset in the transport path 14 corresponding to the plurality of A/Rs 24 and represent ranges in which the A/Rs 24 can work to rivet the fuselage panels 12. The production facility 10 is further provided with the buffer area 34 preset adjacent to the work area 30 in the transport path 14 to which the A/R 24 corresponding to the adjacent work area 30 is moved so as to rivet the fuselage panel 12.

Then, in the case where no fuselage panel 12 to be riveted is present in the work area 30 adjacent to the buffer area 34 and the fuselage panel 12 to be riveted is present in the buffer area 34, the control device 32 of the production facility 10 performs the movement machining processing in which the A/R 24 which corresponds to the work area 30 adjacent to the buffer area 34 is moved to the buffer area 34 to rivet the fuselage panel 12 therein.

As discussed above, because the production facility 10 according to the first embodiment moves the A/R 24 being not used for riveting the fuselage panel 12 to the adjacent buffer area 34 so as to rivet the fuselage panel 12 in the buffer area 34, the operating ratio of the A/Rs 24 is increased and the fuselage panels 12 can be efficiently riveted even in the case where the plurality of fuselage panels 12 having different shapes are continuously riveted.

Further, in the case where the A/R 24 cannot perform riveting due to a breakdown thereof, the work area 30 corresponding to the broken-down A/R 24 may be set as a new buffer area 34, and the A/R 24 adjacent to the newly set buffer area 34 may move to the newly set buffer area 34 and rivet the fuselage panel 12 therein. In the case where the A/R 24 breaks down, the production facility design process as illustrated in FIG. 6 is carried out while setting the broken-down A/R 24 to be not used, and the transport order of the fuselage panels 12 is determined again. In other words, the production rate of the fuselage panels and the number of A/Rs 24 are set in accordance with the number of operational A/Rs 24, the processing (simulation) according to step 200 through step 212 is carried out to determine again the transport order of the fuselage panels 12, and the A/Rs 24 are controlled in accordance with the determined transport order. Note that in step 200, the buffer area number is set while taking the newly set buffer area 34 into consideration.

Second Embodiment

Hereinafter, a second embodiment of the present invention will be described.

Note that the configuration of the production facility 10 according to the second embodiment is the same as the configuration of the production facility 10 according to the first embodiment illustrated in FIG. 1, so the explanation thereof is omitted.

The movement machining processing according to the second embodiment is a kind of processing in which the A/R 24 having no fuselage panel 12 to rivet in the work area 30 corresponding to the stated A/R 24 is moved to another adjacent work area 30 (the work area 30 where the A/R 24 is disposed) to rivet the fuselage panel 12.

Next, the movement machining processing (hereinafter, referred to as "simultaneous multiple A/R processing") according to the second embodiment will be described.

In the simultaneous multiple A/R processing, in the case where the fuselage panel 12 capable of being riveted by the plurality of A/Rs 24 is present in the work area 30 and no fuselage panel 12 to be riveted is present in another work area 30 adjacent to this work area 30, the A/R 24 corresponding to the above another work area 30 is moved to the adjacent work area 30, thereby riveting the fuselage panel 12 by the plurality of A/Rs 24.

The fuselage panel 12 capable of being riveted by the plurality of A/Rs 24 refers to the fuselage panel 12, the riveting of which is not completed by a single A/R 24, such as the fuselage panel 12_*b* or 12_*m*.

Further, in the second embodiment, riveting the fuselage panel 12 by the plurality of A/Rs 24 means riveting the stated fuselage panel 12 by the two A/Rs 24 simultaneously, for example.

Figure 14:
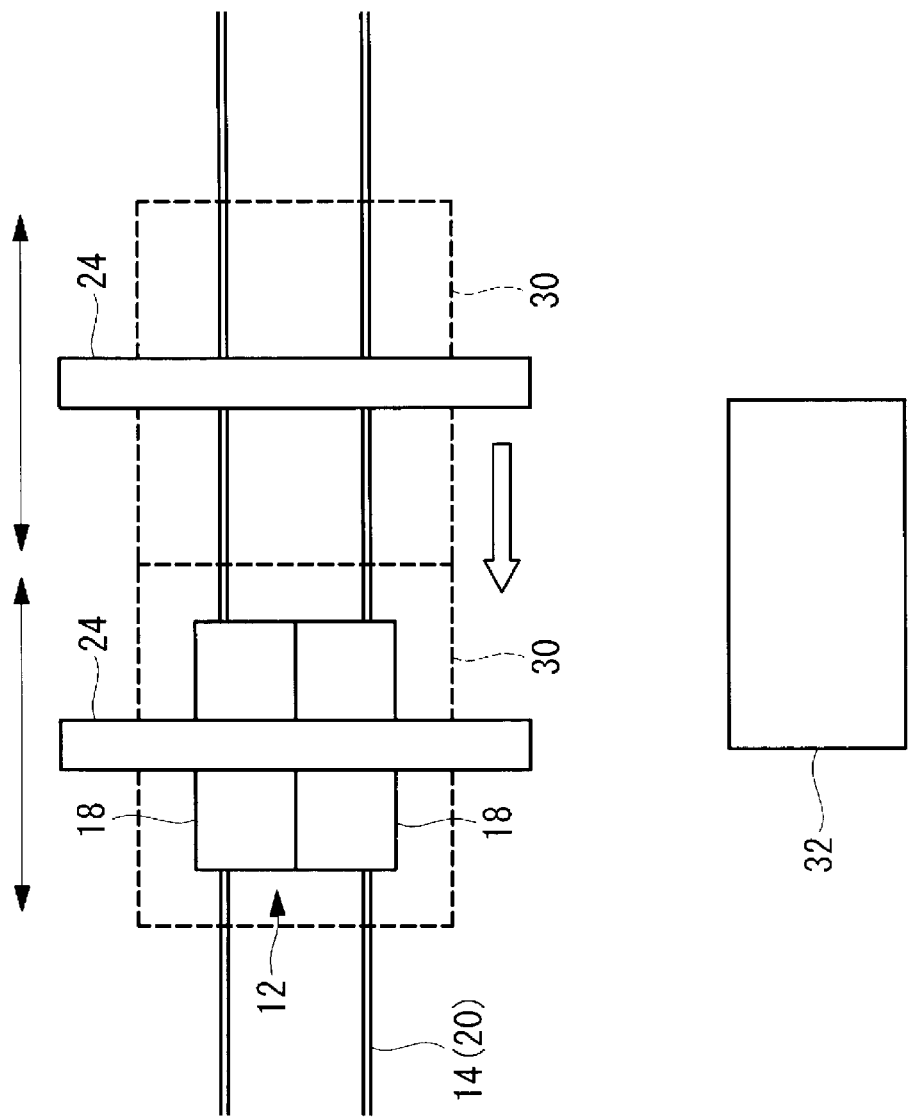
FIG. 14 is a schematic view illustrating A/Rs and work areas according to a second embodiment of the present invention.

In the simultaneous multiple A/R processing, as also illustrated in FIG. 14, the A/R 24 being not used for riveting the fuselage panel 12 is moved to the adjacent work area 30, whereby the plurality of A/Rs 24 cooperate with each other to rivet the one fuselage panel 12. Accordingly, the operating ratio of the A/Rs 24 is increased, and the fuselage panels 12 can be efficiently riveted even in the case where the plurality of fuselage panels 12 having different shapes are continuously riveted.

Figure 15:
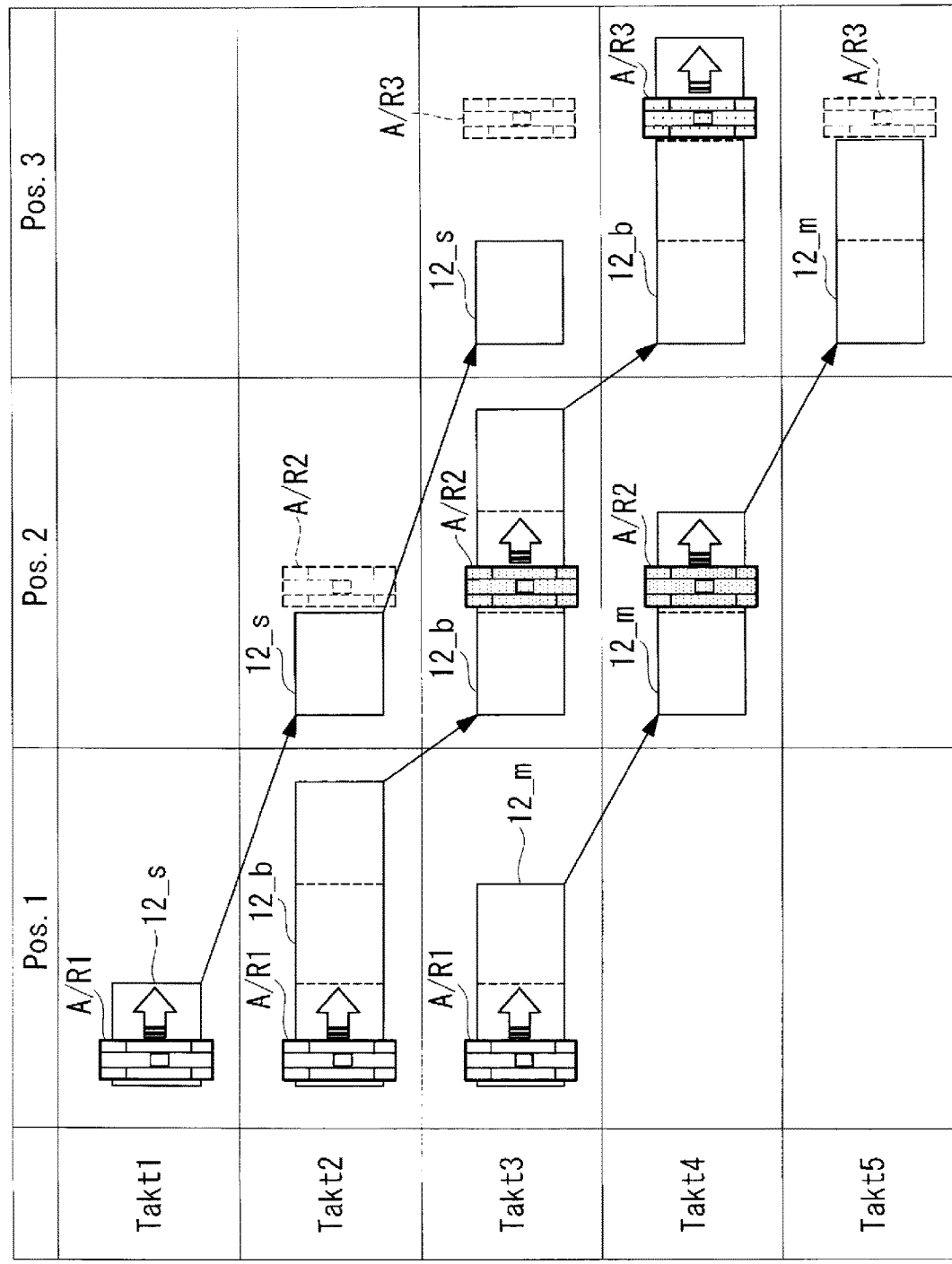
FIG. 15 is a schematic view illustrating operating states of A/Rs in a case where simultaneous multiple A/R processing is not performed.
Figure 16:
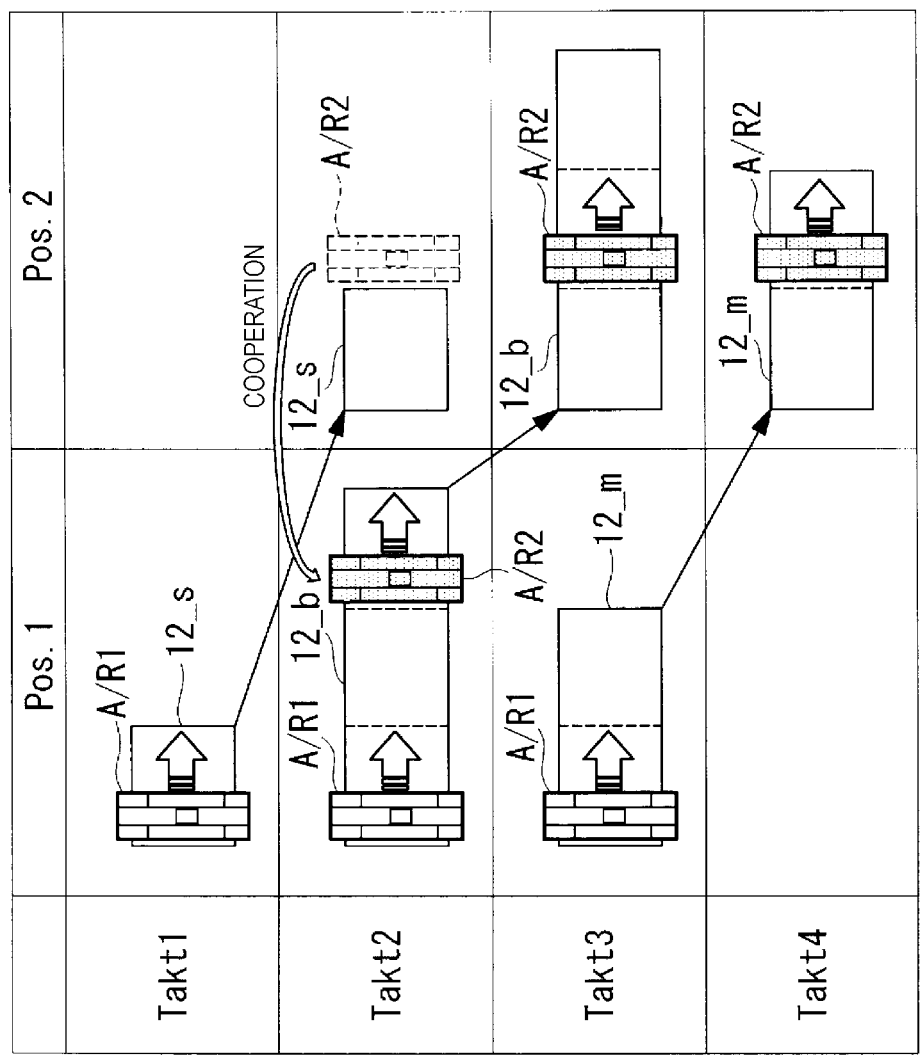
FIG. 16 is a schematic view illustrating the operating states of the A/Rs in a case where the simultaneous multiple A/R processing according to the second embodiment of the present invention is performed.

With reference to FIGS. 15 and 16, a difference in operating states as well as a difference in operating ratios of the A/Rs 24 between a case of the simultaneous multiple A/R processing is not carried out and a case of the simultaneous multiple A/R processing is carried out will be described.

FIG. 15 is a schematic view illustrating the operating states of the A/Rs 24 in the case of the simultaneous multiple A/R processing is not carried out, while FIG. 16 is a schematic view illustrating the operating states of the A/Rs 24 in the case of the simultaneous multiple A/R processing is carried out. In FIGS. 15 and 16, lateral rows represent positions of the respective A/Rs 24, while longitudinal rows (Takt1 to Takt5 or Takt1 to Takt4) represent contents of the production processes carried out in the work areas 30 (Pos. 1 to Pos. 3), in other words, the passage of time.

In an example of FIG. 15, the three A/Rs 24 are provided in the production facility 10, and the small, large, and medium fuselage panels 12 are transported on the transport path 14 in this order.

At Takt1 in FIG. 15, the small fuselage panel 12_*s* is transported and stopped in Pos. 1, and the riveting of the fuselage panel 12_*s* is completed by the A/R1 within the stoppage time.

Next, at Takt2, the large fuselage panel 12_*b* is transported and stopped in Pos. 1, and one third of the total length of the fuselage panel 12_*b* is riveted by the A/R1 within the stoppage time. Although the fuselage panel 12_*s* from Pos. 1 is transported and stopped in Pos. 2, the A/R2 does not operate because the riveting thereof has already been completed.

Next, at Takt3, the medium fuselage panel 12_*m* is transported and stopped in Pos. 1, and half of the total length of the fuselage panel 12_*m* is riveted by the A/R1 within the stoppage time. Further, the fuselage panel 12_*b* from Pos. 1 is transported and stopped in Pos. 2, and a subsequent one third of the fuselage panel 12_*b* is riveted by the A/R2. Although the fuselage panel 12_*s* from Pos. 2 is transported and stopped in Pos. 3, the A/R3 does not operate because the riveting thereof has already been completed.

Next, at Takt4, the fuselage panel 12_*m* from Pos. 1 is transported and stopped in Pos. 2, and the remaining half of the fuselage panel 12_*m* is riveted by the A/R2, thereby completing the riveting of the fuselage panel 12_*m*. Further, the fuselage panel 12_*b* from Pos. 2 is transported and stopped in Pos. 3, and the remaining one third of the fuselage panel 12_*b* is riveted by the A/R3, thereby completing the riveting of the fuselage panel 12_*b*.

Next, at Takt5, although the fuselage panel 12_*m* from Pos. 2 is transported and stopped in Pos. 3, the A/R3 does not operate because the riveting thereof has already been completed.

As discussed above, in the example of FIG. 15 in which the small, large, and medium fuselage panels 12 are transported in this order, the operating ratio of the A/Rs 24 is 67%.

Meanwhile, an example of FIG. 16 indicates a case in which the two A/Rs 24 carry out the simultaneous multiple A/R processing, and like in FIG. 15, the small, large, and medium fuselage panels 12 are transported on the transport path 14 in this order.

At Takt1 in FIG. 16, the small fuselage panel 12_s is transported and stopped in Pos. 1, and the riveting of the fuselage panel 12_s is completed by the A/R1 within the stoppage time.

Next, at Takt2, the large fuselage panel 12_b is transported and stopped in Pos. 1, and one third of the fuselage panel 12_b on the upstream side in a transport direction thereof is riveted by the A/R1 within the stoppage time. Although the fuselage panel 12_s from Pos. 1 is transported and stopped in Pos. 2, the fuselage panel 12 to be riveted in Pos. 2 by the A/R2 is not present because the riveting of the fuselage panel 12_s has already been completed.

Because the fuselage panel 12 to be riveted in Pos. 2 by the A/R2 is not present, the A/R2 moves to Pos. 1 to rivet one third of the fuselage panel 12_b on a downstream side in the transport direction thereof.

Next, at Takt3, the medium fuselage panel 12_m is transported and stopped in Pos. 1, and half of the total length of the fuselage panel 12_m is riveted by the A/R1 within the stoppage time. Further, the fuselage panel 12_b from Pos. 1 is transported and stopped in Pos. 2, and the remaining one third of the fuselage panel 12_b(one third of the total length in the central portion) is riveted by the A/R2, thereby completing the riveting of the fuselage panel 12_b.

Next, at Takt4, the fuselage panel 12_m from Pos. 1 is transported and stopped in Pos. 2, and the remaining half of the fuselage panel 12_m is riveted by the A/R2, thereby completing the riveting of the fuselage panel 12_m.

In the example of FIG. 16, because the production process carried out until the riveting of the small, large, and medium fuselage panels 12 is completed is short in length and the operating ratio of the A/Rs 24 is also increased (operating ratio is 100%) in comparison with the example of FIG. 15, the number of A/Rs 24 can be less.

As discussed above, with the production facility 10 according to the second embodiment, because the one fuselage panel 12 is riveted by the plurality of A/Rs 24, the operating ratio of the A/Rs 24 is increased, and the fuselage panels 12 can be efficiently riveted even in the case where the plurality of fuselage panels 12 having different shapes are continuously riveted.

Figure 17:
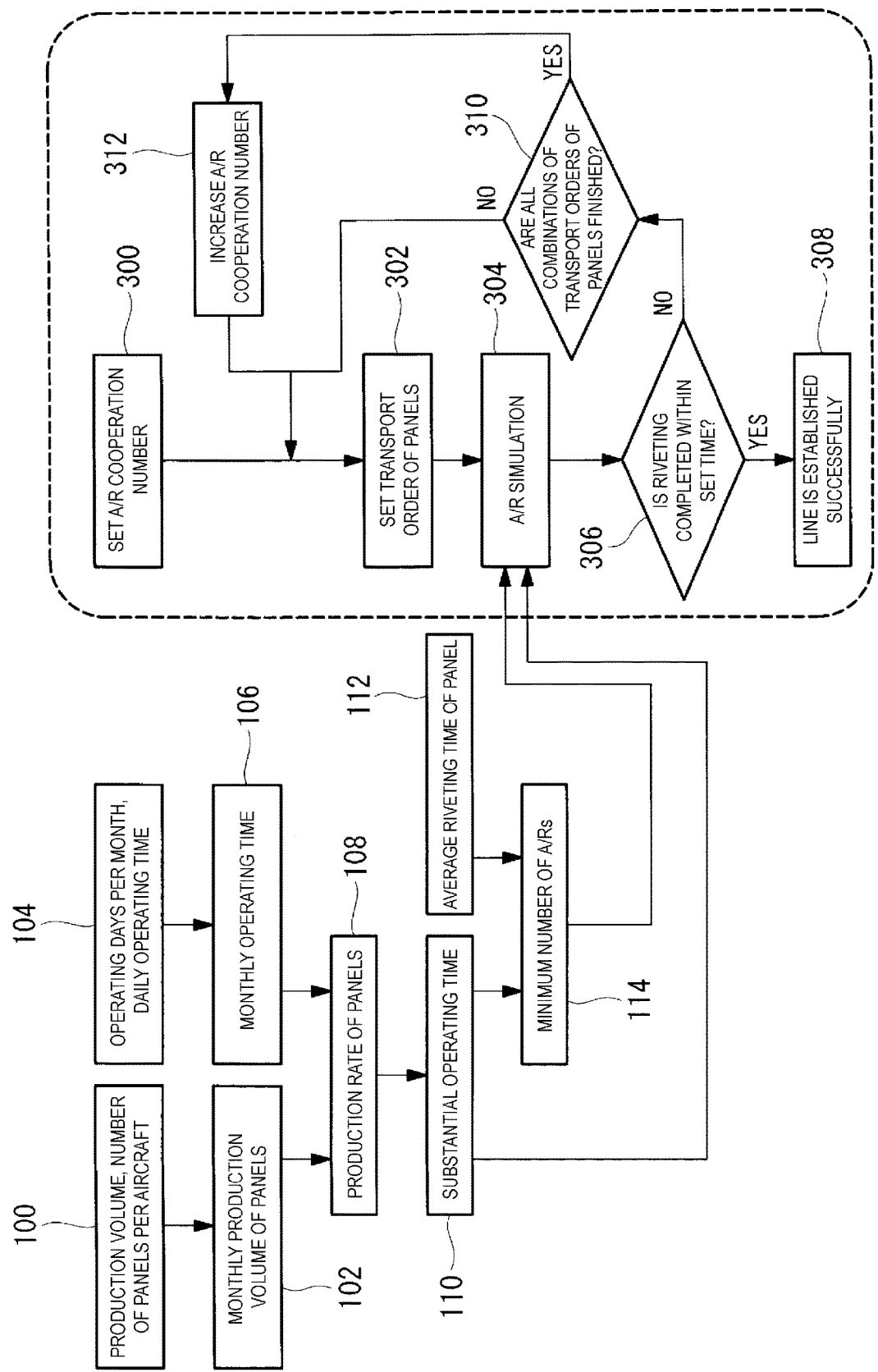
FIG. 17 is a flowchart illustrating the flow of a production facility design process according to the second embodiment of the present invention.

FIG. 17 is a flowchart illustrating the flow of a program executed by the information processing device 50 when the production facility design process according to the second embodiment is carried out. Because step 100 through step 114 in FIG. 17 are the same as those in FIG. 6, description thereof is omitted herein.

The production facility design process according to the second embodiment determines the transport order of the fuselage panels 12 of multiple types and the number of A/Rs 24 configured to move to another work area 30 and rivet the fuselage panel 12 (hereinafter called "cooperation number").

First, a cooperation number $N_{AR}$ is set in step 300. As an initial value, 1 is set for the cooperation number $N_{AR}$ ($N_B$=1). The A/R 24 that moves to another work area 30 (hereinafter called "cooperation A/R") is, for example, the A/R 24 corresponding to the work area 30 on the most downstream side in the transport direction of the fuselage panel 12.

Next, the transport order of the fuselage panels 12 is set in step 302.

Subsequently, in step 304, the A/R simulation is carried out based on the set operating time calculated in step 110, the number of A/Rs 24 determined in step 114, the cooperation number $N_{AR}$ set in step 300, and the transport order of the fuselage panels 12 set in step 302.

Next, in step 306, it is determined whether or not the A/Rs 24 have completed the riveting of the fuselage panels 12 within the set operating time in all the production processes (Takt). If an affirmative determination is given in step 306, the flow goes to step 308.

In step 308, based on the recognition that the production line is successfully established with the set cooperation number $N_{AR}$ as well as the set transport order of the fuselage panels 12, the successful A/R simulation result is stored in the HDD 58.

On the other hand, if a negative determination is given in step 306, the flow goes to step 310.

In step 310, it is determined whether or not the A/R simulation has been carried out and finished in consideration of all the combinations of the transport orders of the fuselage panels 12; then, the flow goes to step 312 if the determination is affirmative. On the other hand, the flow goes to step 302 if the determination is negative, and a transport order, different from the transport orders of the fuselage panels 12 set in the past in the simulation, is set again; then, the A/R simulation is carried out again.

In step 312, because no successful solution is obtained with the set cooperation number $N_{AR}$ and the set transport order of the fuselage panels 12, the cooperation number $N_{AR}$ is set to be increased by 1 ($N_{AR}$=$N_{AR}$+1). In response to the increase in the cooperation number $N_{AR}$, the A/R 24 on the upstream side of the A/R having been set as the cooperation A/R is newly set as a cooperation A/R.

When the setting in step 312 is finished, the flow goes to step 302, where the transport order of the fuselage panels 12 is set again; then, the A/R simulation is carried out again.

Figure 20:
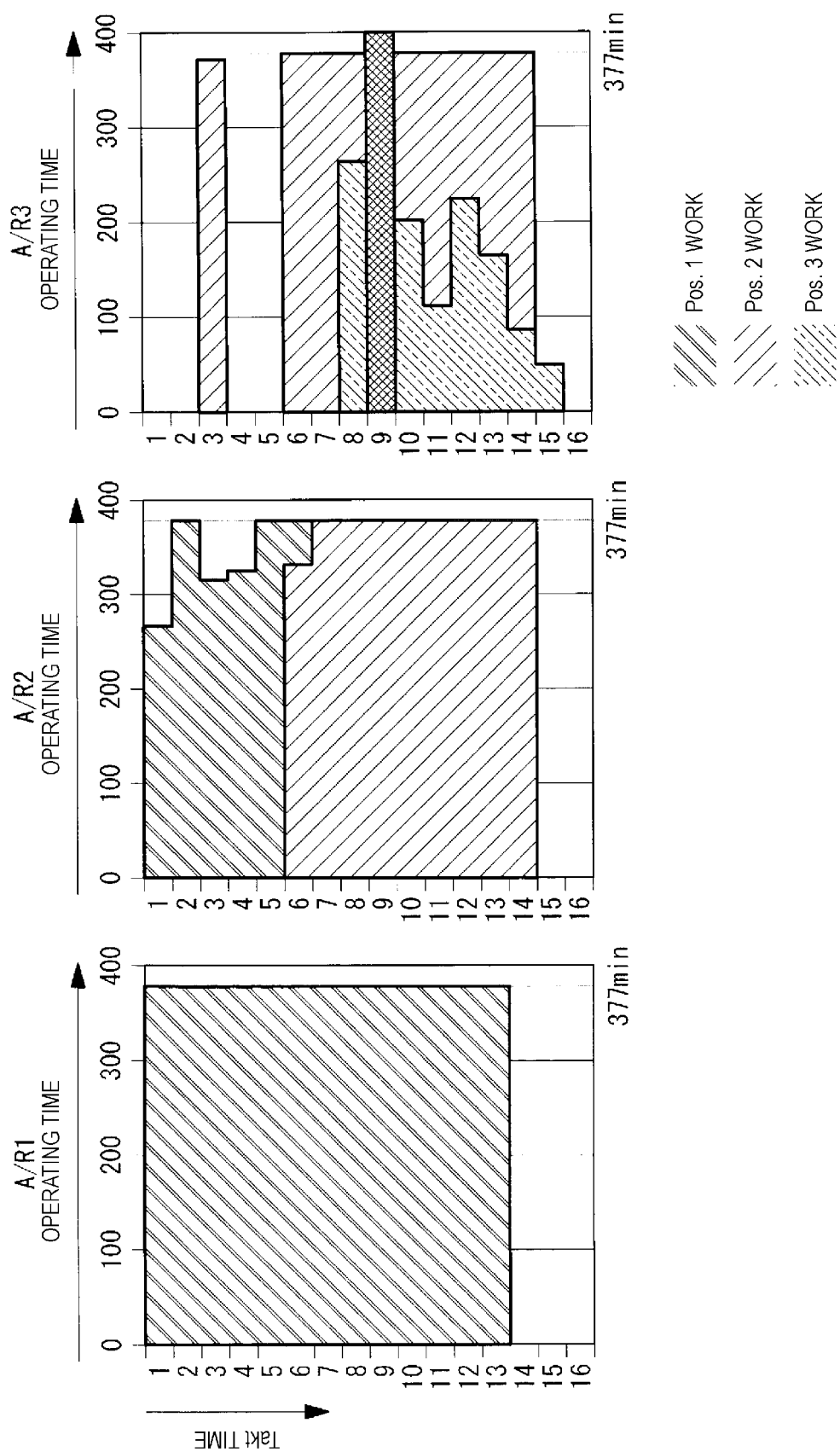
FIG. 20 is a schematic view illustrating an example of the transport order of the fuselage panels in the case where a result of the A/R simulation according to the second embodiment of the present invention is unsuccessful.

FIG. 18 to FIG. 20 illustrate an example of the transport order of the fuselage panels 12 in the case where a result of the A/R simulation is unsuccessful. In the example of FIG. 18 to FIG. 20, the three A/Rs 24 are set, where the A/R2 can move to Pos. 1 and the A/R3 can move to Pos. 2.

FIG. 18 illustrates amounts of time (operating time) consumed in riveting the fuselage panels 12 (13 panels (fuselage panels A to M) as an example) by the respective A/Rs 24 at each Takt.

As illustrated in FIG. 18, at Takt9, the A/R3 rivets the fuselage panel G in Pos. 3; however, the operating time calculated by the A/R simulation is 402 minutes, which exceeds 377 minutes as the substantial operating time (set operating time).

FIG. 19 is a schematic view illustrating riveting times (necessary riveting times) needed for each of the fuselage panels A to M, calculated riveting times (actual riveting times), and differences in time (remaining work) between the necessary riveting times and the actual riveting times.

As illustrated in FIG. 19, all the necessary riveting times and actual riveting times match each other as for the fuselage panels 12 other than the fuselage panel G so that the remaining work is 0; however, as for the fuselage panel G, there is 25 minutes remaining work.

FIG. 20 is a schematic view illustrating respective operating times of the A/R1 to A/R3. All the operating times of the A/R1 and A/R2 in the A/R simulation result are within the substantial operating time (377 minutes). On the other hand, the operating time of the A/R3 at Takt9 exceeds 377 minutes.

Figure 23:
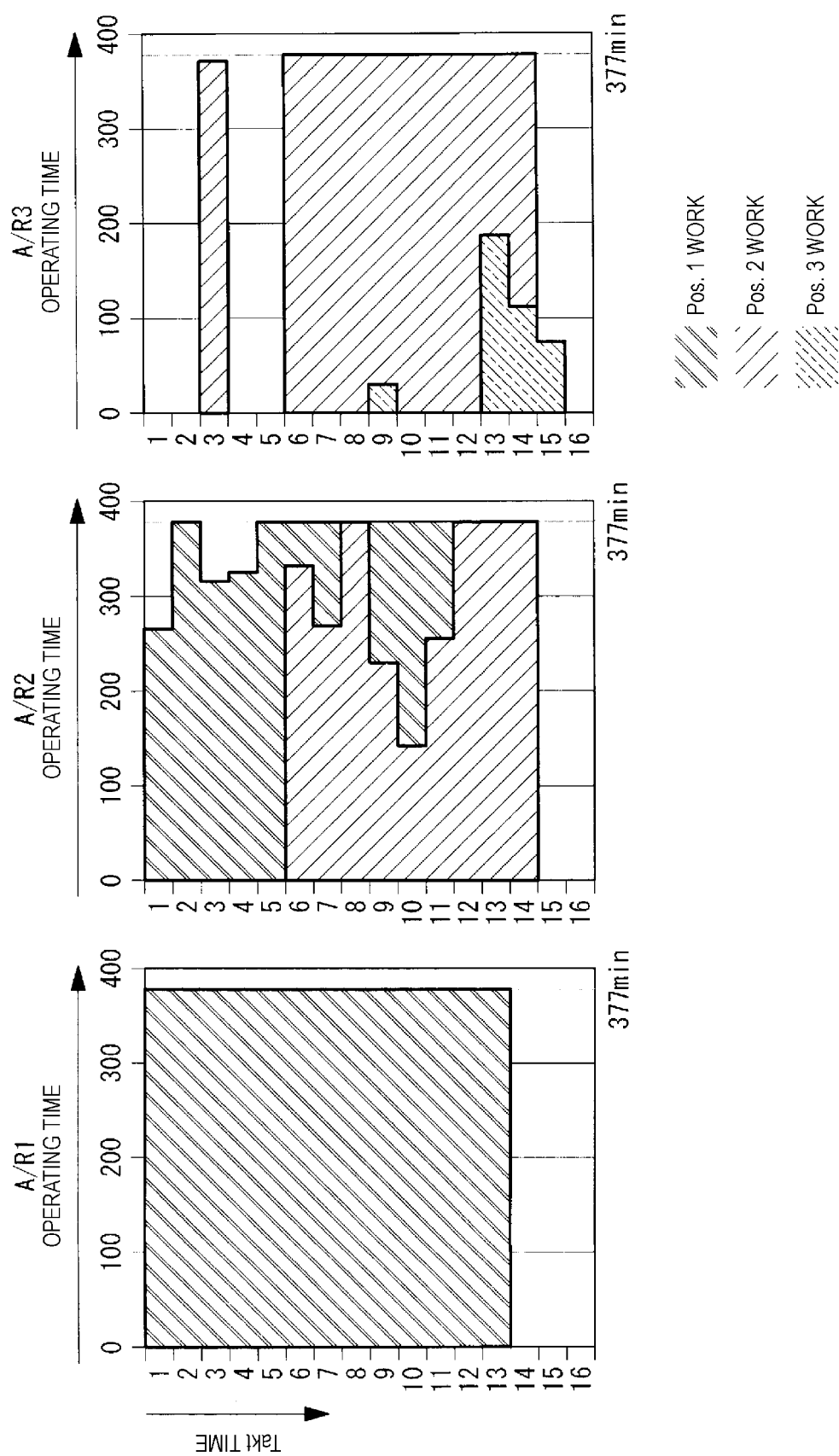
FIG. 23 is a schematic view illustrating an example of the transport order of the fuselage panels in the case where a result of the A/R simulation according to the second embodiment of the present invention is successful.

Meanwhile, FIG. 21 to FIG. 23 illustrate an example of the transport order of the fuselage panels 12 in the case where a result of the A/R simulation is successful, FIG. 21 corresponds to FIG. 18, FIG. 22 corresponds to FIG. 19, and FIG. 23 corresponds to FIG. 20.

As illustrated in FIG. 21, since the result of the A/R simulation is successful, there is no Takt at which the operating time of the A/R 24 exceeds the substantial operating time.

As illustrated in FIG. 22, since the result of the A/R simulation is successful, all the necessary riveting times and actual riveting times match each other across all the fuselage panels 12 so that the remaining work is 0 minute.

As illustrated in FIG. 23, since the result of the A/R simulation is successful, the operating times of all the A/Rs 24 are within the substantial operating time (377 minutes).

As discussed thus far, the simultaneous multiple A/R processing according to the second embodiment moves the A/R 24 being not used for riveting the fuselage panel 12 to another adjacent work area 30, whereby the plurality of A/Rs 24 cooperate with each other to rivet the one fuselage panel 12. Accordingly, with the simultaneous multiple A/R processing, the operating ratio of the A/Rs 24 is increased, and the fuselage panels 12 can be efficiently riveted even in the case where the plurality of fuselage panels 12 having different shapes are continuously riveted.

Further, in the case where the A/R 24 cannot perform riveting due to a breakdown thereof or the like, the adjacent A/R 24 may move to the work area 30 corresponding to the broken-down A/R 24 and rivet the fuselage panel 12 therein in place of the broken-down A/R 24. In this case, the A/R 24 having moved returns, after having finished the riveting in the work area 30 to which the A/R 24 moved, to the work area 30 corresponding to the stated A/R 24 and rivets the fuselage panel 12 therein again. In the case where the A/R 24 breaks down, the production facility design process as illustrated in FIG. 17 is carried out while setting the broken-down A/R 24 to be not used, and the transport order of the fuselage panels 12 is determined again. In other words, the production rate of the fuselage panels and the number of A/Rs 24 are set in accordance with the number of operational A/Rs 24, the processing (simulation) according to step 300 through step 312 is carried out to determine the transport order of the fuselage panels 12 again, and the A/Rs 24 are controlled in accordance with the determined transport order.

In the above, the present invention has been described using the aforementioned embodiments; however, the technical scope of the present invention is not limited to the scope described in the aforementioned embodiments. Various modifications or improvements can be added to the aforementioned embodiments without departing from the gist of the invention, and aspects obtained by adding the modifications or improvements are also included within the technical scope of the present invention. Also, the aforementioned embodiments may be combined as appropriate.

For example, in the aforementioned embodiments, although the description has been given regarding a mode in which the machining target 12 is taken as the aircraft fuselage panel 12, the transport device 16 is taken as the AGV 16 and the processing device 24 is taken as the A/R 24, the present invention is not limited thereto and another mode is also permissible. Further, all the plurality of processing devices 24 may not be of the same type; the processing devices 24 of different types may be mixed, the processing device 24 that does not contribute to the movement machining processing may be included, or processing performed by manual operation of a worker may be included between the processing devices 24.

Furthermore, the flow of the program described in each of the aforementioned embodiments is also an example, and an unnecessary step may be deleted, a new step may be added, and the processing order may be changed without departing from the gist of the present invention.

REFERENCE SIGNS LIST

10 Production facility
12 Fuselage panel (Machining target)
14 Transport path
16 AGV (Transport device)
24 A/R (Processing device)
30 Work area
32 Control device
34 Buffer area

The invention claimed is:

1. A production facility comprising:
   a guide vehicle configured to transport a plurality of machining targets of multiple types having different shapes in a mixed state on a predetermined transport path as a production line;
   a plurality of processing tools configured to process the machining targets transported on the transport path;
   a plurality of work regions preset in a transport direction of the transport path, each corresponding to a different processing tool of the plurality of processing tools, and each representing a range in which the corresponding processing tool can work to process the transported machining targets; and
   a controller configured to control the guide vehicle to transport the machining targets from one of the work regions to another one of the work regions arranged on a downstream side in the transport direction and perform movement machining processing in which the processing tool not having the machining target to process in the work region corresponding to the processing tool is moved to another one of the adjacent work regions so as to process the machining target.

2. The production facility according to claim 1, further comprising:
   a spare work region preset adjacent to the work region in the transport path to which the processing tool corresponding to the adjacent work region moves so as to process the machining target,
   wherein the movement machining processing moves the processing tool, which corresponds to the work region adjacent to the spare work region, to the spare work region to process the machining target in a case where the machining target to be processed is not present in the work region adjacent to the spare work region and the machining target to be processed is present in the spare work region.

3. The production facility according to claim 2,
   wherein the spare work region is set between the work regions.

4. The production facility according to claim 1,
   wherein, in a case where the machining target capable of being processed by the plurality of processing tools is present in the work region and the machining target to be processed in another one of the other work regions adjacent to the work region is not present, the movement machining processing moves the processing tool corresponding to the another work region to the adjacent work region so as to process the machining target by the plurality of processing tools.

5. A production facility design method, comprising:
taking a time that each of the processing tools can use for processing the machining target as a set time; and
determining a transport order of the machining targets of multiple types so that an operating time of each of the processing tools does not exceed the set time in a case where the movement machining processing according to claim 1 is performed.

6. The production facility design method according to claim 5, further comprising:
calculating a minimum number of the processing tools necessary to process the machining targets by dividing an average processing time of each of the machining targets by the set time and determining the transport order of the machining targets of multiple types based on the calculated minimum number.

7. A production facility control method for a production facility provided with a guide vehicle configured to transport a plurality of machining targets of multiple types having different shapes in a mixed state on a predetermined transport path as a production line, a plurality of processing tools configured to process the machining targets transported on the transport path, and a plurality of work regions preset in a transport direction of the transport path, each corresponding to a different processing tool of the plurality of processing tools, and each representing a range in which the corresponding processing tool can work to process the transported machining targets, the method comprising:
controlling the guide vehicle to transport the machining targets from one of the work regions to another one of the work regions arranged on a downstream side in the transport direction, and
performing movement machining processing in which the processing tool not having the machining target to process in the work region corresponding to the processing tool is moved to another one of the adjacent work regions so as to process the machining target.

8. A manufacturing method, comprising:
manufacturing a machining target using the production facility according to claim 1.

* * * * *